(12) United States Patent
Blanco et al.

(10) Patent No.: US 11,226,624 B2
(45) Date of Patent: Jan. 18, 2022

(54) SYSTEM AND METHOD FOR ENABLING A 360-DEGREE THREAT DETECTION SENSOR SYSTEM TO MONITOR AN AREA OF INTEREST SURROUNDING A VEHICLE

(71) Applicant: MOTOROLA SOLUTIONS, INC, Chicago, IL (US)

(72) Inventors: Alejandro G. Blanco, Charlotte, NC (US); Fabio M. Costa, Weston, FL (US); Shervin Sabripour, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 392 days.

(21) Appl. No.: 16/381,118

(22) Filed: Apr. 11, 2019

(65) Prior Publication Data

US 2020/0326704 A1  Oct. 15, 2020

(51) Int. Cl.
*G06Q 50/26* (2012.01)
*G05D 1/00* (2006.01)
*G05D 1/02* (2020.01)

(52) U.S. Cl.
CPC ......... *G05D 1/0088* (2013.01); *G05D 1/0231* (2013.01); *G05D 1/0257* (2013.01); *G05D 1/0287* (2013.01); *G06Q 50/265* (2013.01); *G05D 2201/0209* (2013.01)

(58) Field of Classification Search
CPC .. G05D 1/0088; G05D 1/0257; G05D 1/0287; G05D 1/0231; G05D 2201/0209; G06Q 50/265
See application file for complete search history.

(56) References Cited

U.S. PATENT DOCUMENTS

| | | | |
|---|---|---|---|
| 9,437,111 B2 | 9/2016 | Ignaczak et al. | |
| 9,939,817 B1 | 4/2018 | Kentley-Klay et al. | |
| 10,139,827 B2 | 11/2018 | Charette et al. | |
| 2008/0243380 A1* | 10/2008 | Han | G01C 21/3697 701/431 |
| 2014/0324330 A1* | 10/2014 | Minemura | G08G 1/16 701/301 |

(Continued)

FOREIGN PATENT DOCUMENTS

WO  2014129962 A1  8/2014

*Primary Examiner* — Donald J Wallace
*Assistant Examiner* — Daniel M. Robert
(74) *Attorney, Agent, or Firm* — Raguraman Kumaresan

(57) ABSTRACT

A process and system for enabling a 360-degree threat detection sensor system that is physically coupled to a vehicle to monitor an area of interest surrounding the vehicle. An electronic computing device selects an area of interest surrounding a vehicle stop location to be monitored by the sensor system. When the sensor system has an obstructed field-of-view of the area of interest, the electronic computing device determines a new vehicle stop location at which the sensor system has an unobstructed field-of-view of the area of interest when the vehicle is to be stopped at the new vehicle stop location. The electronic computing device then transmits an instruction to a target electronic device to provide an electronic indication identifying the new vehicle stop location to a registered occupant of the vehicle, or autonomously control the vehicle to stop at the new vehicle stop location.

17 Claims, 12 Drawing Sheets

(56) References Cited

U.S. PATENT DOCUMENTS

| | | | |
|---|---|---|---|
| 2015/0348417 A1* | 12/2015 | Ignaczak | G08B 25/08 |
| | | | 340/435 |
| 2017/0115387 A1* | 4/2017 | Luders | G01S 17/87 |
| 2018/0081357 A1* | 3/2018 | Datta Gupta | G05D 1/021 |
| 2018/0261095 A1* | 9/2018 | Qiu | G05D 1/0022 |
| 2019/0025843 A1* | 1/2019 | Wilkinson | G05D 1/0212 |
| 2019/0193727 A1* | 6/2019 | Noda | B60W 10/184 |
| 2019/0243371 A1* | 8/2019 | Nister | G05D 1/0231 |
| 2019/0384302 A1* | 12/2019 | Silva | G05D 1/0088 |
| 2020/0074735 A1* | 3/2020 | Nowakowski | B60R 1/00 |
| 2020/0079310 A1* | 3/2020 | Kline | B60R 25/33 |
| 2020/0143179 A1* | 5/2020 | Naser | G06K 9/3208 |
| 2020/0200896 A1* | 6/2020 | Shan | G01S 13/931 |

\* cited by examiner

SYSTEM AND METHOD FOR ENABLING A 360-DEGREE THREAT DETECTION SENSOR SYSTEM TO MONITOR AN AREA OF INTEREST SURROUNDING A VEHICLE

BACKGROUND OF THE INVENTION

First responders and other types of users, such as private security personnel, may be under a constant threat of physical harm and safety based on their position and/or function. This is especially true when the first responder is within or nearby his or her vehicle and has his or her attention focused on other activities, such as writing incident reports, researching case or offender information via personal or vehicular electronic devices, or canvassing an incident scene for clues or evidence. As a result, the first responder may not be alert and may be more likely to inadvertently subject himself or herself to an unsafe situation.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
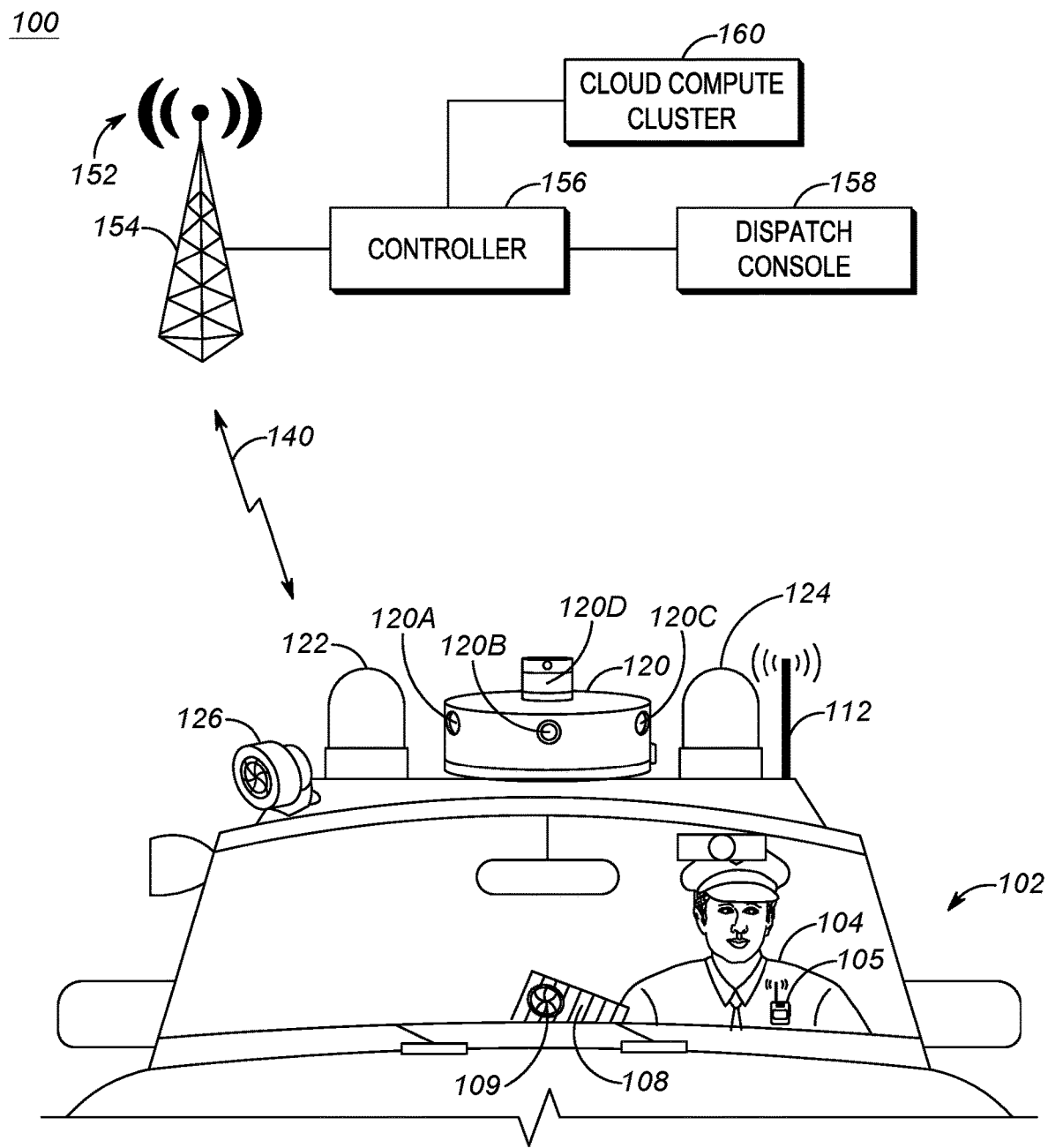
FIG. 1 is a system diagram illustrating a system for enabling a 360-degree threat detection sensor system to monitor an area of interest surrounding a vehicle, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Officers responding to an incident may park their vehicles in a variety of positions, for instance, to establish a perimeter surrounding an incident area, or to focus their attention on activities such as writing an incident report. As mentioned above, when the officer is within or nearby his or her vehicle and has his or her attention focused on other activities, the officer may subject himself/herself to unsafe situation due to approaching threats. During such situations, vehicle-based sensor systems can be enabled to monitor an area surrounding the vehicle and further alert the officer about approaching threats. However, in the real-world, a vehicle may be surrounded by several physical features such as trees, buildings, or other vehicles that could preclude the vehicle-based cameras and sensors from monitoring the obstructed areas surrounding the vehicle. In some cases, the relative positioning of the features surrounding the vehicle makes it difficult for a user to manually identify a single parking location for the vehicle that would allow the vehicle-based sensors system to simultaneously monitor multiple designated areas surrounding the vehicle. In addition, the likelihood of threat originating from different areas surrounding the vehicle may not be the same and therefore only particular areas surrounding the vehicle may be of interest for monitoring and detecting threats. For example, an area with a protected space that provides a direct travel path toward the vehicle may have a higher likelihood of threat originating from that area as compared to other areas surrounding the vehicle. Also, some areas surrounding the vehicle may already be under direct surveillance through other means (e.g., fixed surveillance cameras), and therefore, in such cases, the vehicle-based sensor system may not need to be positioned to specifically monitor such areas. Accordingly, there is a technological need to determine an optimal stop location for the vehicle (i.e., a potential location at which the vehicle could be parked or stopped) that would allow the vehicle-based sensor systems coupled to the vehicle to be not precluded by the surrounding objects from monitoring an area of interest (e.g., an obstructed area that is prioritized/designated for detecting approaching threats) surrounding the vehicle.

One embodiment provides a method for enabling a 360-degree threat detection sensor system to monitor an area of interest surrounding a vehicle. The method includes determining, at an electronic computing device, a first vehicle stop location corresponding to a current stopped location of a vehicle or a predetermined vehicle stop location; selecting, at the electronic computing device, an area of interest surrounding the first vehicle stop location to be monitored by a 360-degree threat detection sensor system that is physically coupled to the vehicle; determining, at the electronic computing device, whether the 360-degree threat detection sensor system has an obstructed field-of-view of the selected area of interest when the vehicle is stopped at the first vehicle stop location; responsive to determining that the 360-degree threat detection sensor system has an obstructed field-of-view of the area of interest, determining, at the electronic computing device, a second vehicle stop location at which the 360-degree threat detection sensor system has an unobstructed field-of-view of the area of interest when the vehicle is to be stopped at the second vehicle stop location; and transmitting, at the electronic computing device, an instruction to one or more target electronic devices to cause one of (i) an electronic indication identifying the second vehicle stop location to be provided to a registered occupant of the vehicle, and (ii) the vehicle to be autonomously stopped at the second vehicle stop location.

A further embodiment provides an electronic processing system for enabling a 360-degree threat detection sensor system to monitor an area of interest surrounding a vehicle. The electronic processing system includes a memory, a transceiver, a 360-degree threat detection sensor system physically coupled to a vehicle, and one or more electronic processors communicatively coupled to the memory, the transceiver, and the 360-degree threat detection sensor system. The one or more electronic processors are configured to: determine a first vehicle stop location corresponding to a current stopped location of a vehicle or a predetermined vehicle stop location; select an area of interest surrounding the first vehicle stop location to be monitored by a 360-degree threat detection sensor system that is physically coupled to the vehicle; determine whether the 360-degree threat detection sensor system has an obstructed field-of-view of the selected area of interest when the vehicle is stopped at the first vehicle stop location; responsive to determining that the 360-degree threat detection sensor system has an obstructed field-of-view of the area of interest, determine one or more second vehicle stop locations at which the 360-degree threat detection sensor system has an unobstructed field-of-view of the area of interest when the vehicle is to be stopped at the second vehicle stop locations; and transmit, via the transceiver, an instruction to one or more target electronic devices to cause one of (i) an electronic indication identifying one or more of the second vehicle stop locations to be provided to a registered occupant of the vehicle, and (ii) the vehicle to be autonomously stopped at one of the second vehicle stop locations.

Each of the above-mentioned embodiments will be discussed in more detail below, starting with example communication system and device architectures of the system in which the embodiments may be practiced, followed by an illustration of processing steps for achieving the method and system for enabling a 360-degree threat detection sensor system to monitor an area of interest surrounding a vehicle. Further advantages and features consistent with this disclosure will be set forth in the following detailed description, with reference to the figures.

Referring now to the drawings, and in particular FIG. 1, an example communication system diagram illustrates a system 100 including a vehicle 102 and an example wireless infrastructure radio access network (RAN) 152. The vehicle 102 is illustrated with a vehicle occupant including an officer 104 having an associated personal radio communication device 105. The vehicle 102 is equipped with a vehicular computing device 108, an internal speaker 109, and an antenna 112 communicatively coupled to a transceiver at the vehicular computing device 108 for communicating with other computing devices in an ad-hoc manner or in an infrastructure manner via RAN 152, a 360-degree (360°) threat detection sensor system 120 (also referred to as integrated vehicular appliance 120) for capturing 360° field-of-view of an area surrounding the vehicle 102 to detect threats, external lights 122 and 124, and external speaker 126.

The vehicle 102 may be a human-operable vehicle, or may be partially or fully self-driving vehicle operable under control of the vehicular computing device 108 perhaps in cooperation with the 360-degree threat detection sensor system 120. The 360-degree threat detection sensor system 120 may include one or more visible-light camera(s), infrared light camera(s), time-of-flight depth camera(s), radio wave emission and detection (such as radio direction and distancing (RADAR) or sound navigation and ranging (SONAR) device(s)), and/or light detection and ranging (LiDAR) devices for self-driving purposes and/or for the other purposes as set forth herein. The vehicular computing device 108 may further contain an application (e.g., a mapping and routing application) that may provide an input interface (touch, keyboard, voice, wireless transceiver, etc.) for a user such as the officer 104 to enter an intended destination or assigned incident location, or to select a particular area of interest (e.g., an area that is obstructed by an object) that needs to be monitored via the 360-degree threat detection sensor system 120 for detecting threats.

The officer 104 is illustrated in FIG. 1 as an officer (e.g., such as a police officer), but in other embodiments, may be any type of registered vehicle occupant, that may drive the vehicle 102 to a particular location (e.g., an incident location), or may enter an intended location. The officer 104 may be interested in receiving alert notification (e.g., on officer's personal radio communication device 105, or via internal speaker 109) related to detected threats in one or more areas of interest surrounding the vehicle 102. The officer 104 may, in other embodiments, work for other governmental and non-governmental agencies such as park districts, real estate offices, and other types of security details. The officer 104 is also equipped with an associated personal radio communication device 105, which may be carried as a hip radio, as an integrated radio-speaker-microphone (RSM) device, or some other electronic device capable of communicating via short-range and/or long-range wireless communication links with the vehicular computing device 108, with each other, and/or with controller 156 via RAN 152, among other possibilities.

The personal radio communication device 105 may be any mobile computing device used for infrastructure RAN or direct-mode media (e.g., voice, audio, video, etc.) communication via a long-range wireless transmitter and/or transceiver that has a transmitter transmit range on the order of miles (e.g., 0.5-50 miles, or 3-20 miles and in comparison to a short-range transmitter such as a Bluetooth, Zigbee, or NFC transmitter) with other mobile computing devices and/or the infrastructure RAN 152. The long-range transmitter may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long-range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

In addition to or as an alternative to the long-range transmitter or transceiver, the radio communication device 105 may further contain a short-range transmitter or transceiver that has a transmitter transmit range on the order of meters (e.g., such as a Bluetooth, Zigbee, or NFC connection having a transmit range on the order of 0.01-100 meters, or 0.1-10 meters) for communicating with each other or with other computing devices such as vehicular computing device 108. The radio communication device 105 may further contain one or more physical electronic ports (such as a USB port, an Ethernet port, an audio jack, etc.) for direct electronic coupling with other computing devices such as vehicular computing device 108 or for coupling with other accessories such as a radio speaker microphone (RSM).

The radio communication device 105 may additionally contain a push to talk (PTT) button that enables transmission of voice audio captured at a microphone of the radio communication device 105 to be transmitted via its short-range or long-range transceiver to other radio communication devices or to other computing devices such as dispatch console 158 via RAN 152, and enables reception of voice audio (when not depressed) received at the radio communication device via its long-range or short-range receiver and played back via a speaker of the radio communication device 105. In those embodiments where the radio communication device is a full-duplex device, instead of a half-duplex device, depression of the PTT button may allow simultaneous transmission and reception of voice audio, instead of mere reception, among other communication media types such as video. The radio communication device 105 may further include a display screen for displaying images (e.g., a visual map identifying the obstructed areas surrounding the vehicle 102), video, and/or text. Such a display screen may be, for example, a liquid crystal display (LCD) screen or an organic light emitting display (OLED) display screen. In some embodiments, a touch sensitive input interface may be incorporated into the display screen as well, allowing the officer 104 to interact with content (e.g., to select a particular area of interest for monitoring via the 360-degree threat detection sensor system 120) provided on the display screen. A soft PTT input may also be provided, for example, via such a touch interface. Furthermore, a video camera may be provided at the radio communication device 105, integrating an ability to capture images and/or video and store the captured image data (for further analysis) or transmit the captured image data as an image or video stream to the vehicular computing device 108, to other radio communication devices, and/or to other computing devices via RAN 152. The radio communication device 105 may provide an alert notification when a threat is detected based on the data produced by the 360-degree threat detection sensor system 120. In one embodiment, the radio communication device 105 also provides an electronic indication identifying a new stop location for the vehicle 102 that would enable the 360-degree threat detection sensor system 120 physically coupled to the vehicle 102 to monitor an area of interest, for example, by gaining and/or retaining field-of-view of an area of interest that is obstructed by one or more detected physical features (interchangeably referred to as objects).

Vehicular computing device 108 may be any computing device specifically adapted for operation within the vehicle 102, and may include, for example, a vehicular console computing device, a tablet computing device, a laptop computing device, or some other computing device commensurate with the rest of this disclosure and may contain many or all of the same or similar features as set forth above with respect to the radio communication device 105. In some embodiments, the vehicular computing device 108 may form a hub of communication connectivity for one or more of the associated radio communication device 105, the 360-degree threat detection sensor system 120, the external lights 122, 124, and the speakers 109, 126, each of which may be communicatively coupled to the vehicular computing device 108 via one or both of a wired communication link and a short-range wireless communication link. The vehicular computing device 108 may further include or have access to a transceiver and may be coupled to antenna 112 and through which the vehicular computing device 108 itself and the above-mentioned other devices may further communicate with or be accessed by a long-range wireless communication link with RAN 152, such as via LTE or LMR. The vehicular computing device 108 may similarly provide alert notification about detected threats or alternatively to provide information about the new stop location for the vehicle 102 that would enable the 360-degree threat detection sensor system 120 physically coupled to the vehicle 102 to monitor the area of interest.

Internal speaker 109 is an audio output-device communicatively coupled to the vehicular computing device 108 and perhaps indirectly paired to the radio communication device 105, for playing back audio such as a public safety tone, series of tones, or spoken words (e.g., to alert the officer 104 about approaching threats or alternatively to instruct the officer 104 to drive the vehicle 102 to a new stop location to enable the 360-degree threat detection sensor system 120 to monitor an area of interest which is obstructed due to one or more objects surrounding the vehicle's 102 current stop location) that may then be perceived by occupants within the vehicle 102 such as the officer 104. In some embodiments, speaker 109 may be replaced with a plurality of speakers displaced throughout the internal cabin of the vehicle 102 and selectively enabled in accordance with a detected approaching threat of a particular area of interest surrounding the vehicle 102 such that a particular one of the plurality of speakers closest to the approaching threat is selected to playback the tone, spoken notification, or other type of speech output to indicate a relative direction of the approaching threat.

The 360-degree threat detection sensor system 120 is a communicatively coupled set of one or more electronic ranging devices that may include one or more capture-only devices and/or one or more emit and capture devices. More specifically, the set of one or more electronic ranging devices may include one or more of visible-light capture camera(s), infrared capture camera(s), time-of-flight depth camera(s), radio wave distancing device(s), and/or light detection and ranging (LiDAR) device(s), among other possibilities. The 360-degree threat detection sensor system 120 is physically coupled to the vehicle 102, such as centrally positioned atop the vehicle 102 as illustrated in FIG. 1, or in other embodiments, may be distributed amongst various satellite locations around the vehicle 102 and wiredly or wirelessly coupled to a centralized processing device such as an enclosure same or similar to that illustrated in FIG. 1 as the 360-degree threat detection sensor system 120 or perhaps to the vehicular computing device 108, among other possibilities. When disposed in a distributed fashion, portions of the 360-degree threat detection sensor system 120 may be disposed in other parts of the vehicle 102, such as in the external lights 122 and 124 (which in other embodiments not illustrated may take the form of an elongated light bar positioned atop the vehicle 102), within one or more side or rear view mirrors, integrated into a rear-view camera, or other locations or devices distributed across the internal or external portions of the vehicle 102 and having a view surrounding the vehicle 102.

The 360-degree threat detection sensor system 120 is configured, by itself or in cooperation with vehicular computing device 108, to monitor an area surrounding the vehicle 102 for detecting threats. The 360-degree threat detection sensor system 120 may be continuously on and leveraging its electronic ranging devices to detect an approaching threat in an area surrounding the vehicle 102, may only periodically be turned on at a regular or semi-regular cadence to detect whether there are any approaching threats in an area surrounding the vehicle 102, or may be triggered to begin scanning for threats surrounding the vehicle 102 upon occurrence of some other trigger detected at the 360-degree threat detection sensor system 120 or vehicular computing device 108, or upon receipt of an instruction from, for example, the vehicular computing device 108 or the RAN 152, among other possibilities.

The one or more electronic ranging devices may comprise a single scanning device having a field-of-view of less than 360° and that is then caused to rotate and scan at a particular frequency, such as rotating 1-10 times per second to create a 360° field-of-view of the area surrounding the 360-degree threat detection sensor system 120 and thus the vehicle 102 to which it is attached. In other embodiments, a plurality of range detection devices, each having a field-of-view less than 360°, may be statically placed around the 360-degree threat detection sensor system 120 or in a distributed manner around the vehicle 102 as set forth earlier, to altogether enable a 360° field-of-view of the area surrounding the 360-degree threat detection sensor system 120 and thus the vehicle 102 to which it is attached. In still other embodiments, and for both visible or infrared light imaging systems and radio-wave imaging systems, complex optics and/or waveguides may be used to enable capture of a 360° field-of-view of a single static light imaging or radio wave detection sensor, for example, after which image processing or radiometry processing algorithms may be used to de-warp or otherwise compensate for distortions introduced into the captured data by the optics and/or waveguides, as necessary. As just one example, and as illustrated in FIG. 1, the 360-degree threat detection sensor system 120 may include one or more static visible light imaging devices 120A-C each having an approximate 90° field-of-view (and further including a fourth imaging device facing backwards and not illustrated in FIG. 1) that may be combined optically or digitally at the 360-degree threat detection sensor system 120 or the vehicular computing device 108 to provide visible-light imaging functionality across a 360° field-of-view, and may further include an active scanning RADAR emitter and detector 120D positioned above the visible light imaging devices 120A-C to provide both light-imaging and radio wave reflection range detection capabilities. Other arrangements and combinations are possible as well.

In accordance with some embodiments, data produced by the electronic ranging devices may then be used at the 360-degree threat detection sensor system 120 and/or the vehicular computing device 108 to detect one or more objects (e.g., physical features such as building structures, persons, vehicles, trees, and the like) that is causing the 360-degree threat detection sensor system 120 to have an obstructed field-of-view of an area of interest surrounding the vehicle 102. Similarly, the data can also be used to monitor an area of interest surrounding the vehicle 102 for detecting an object approaching the vehicle 102 and for further classifying it as a threat based on the characteristics of the detected object. For instance, the data produced by electronic ranging devices can be used to determine a range (relative to the vehicle 102) of one or more objects approaching the vehicle 102, perhaps in addition to other characteristics of the approaching object including but not limited to, a cross-sectional shape, an initial position, a current position, a velocity, an acceleration, a bearing, and/or a size (length, width, and/or height) of the object. The 360-degree threat detection sensor system 120 and/or the vehicular computing device 108 may also then use the characteristics to predict a future location, path, trajectory, or status of the object. Such characteristics may additionally or alternatively be used to classify the object as a person (including type of person such as adult or child), vehicle 102 (including type of vehicle 102 such as car, motorcycle, or airborne drone), animal (including type of animal such as cat or dog), or other type of object. Such characteristics, predictions, and classifications may be stored in a memory at the 360-degree threat detection sensor system 120 and/or the vehicular computing device 108 accompanying or separate from an image, point cloud, or echo map illustrative of the object or objects detected by the electronic ranging devices. The characteristics, predictions, and classifications and/or the image, point cloud, or echo maps may be stored at the 360-degree threat detection sensor system 120 and/or the vehicular computing device 108, and/or may be transmitted to a separate storage or processing device (such as controller 156, dispatch console 158, or cloud computer cluster 160) via infrastructure RAN 152, among other possibilities.

Each of the electronic ranging devices may have an associated ranging function associated with it for determining an approximate range of a detected object or threat from the 360-degree threat detection sensor system 120 and thus the vehicle 102. For example, for visible light or infrared light imaging devices incorporated into the 360-degree threat detection sensor system 120, pre-configured portions of the captured image frames may be associated with particular distances. For example, a lower quarter of the frame, perhaps identified via pixel count, may be associated with a distance of 5-10 m (or 7 m) from the vehicle 102, while a second quarter of the frame may be associated with a distance of 10-20 m (or 15 m) from the vehicle 102, and a remainder of the frame associated with indeterminate distances or above-horizon distances. Such mappings between frame portions and distances may be varied based on parameters such as pan, tilt, zoom settings (if any) of the imaging cameras, a detected orientation of the vehicle 102 and/or the 360-degree threat detection sensor system 120 beyond level, or other detected variations. In still other embodiments, direct mappings may not be used, but instead, analytics applied to capture images that use known or learned sizes of known or learned objects detected in the frame to calculate relative distances from the vehicle 102 or the 360-degree threat detection sensor system 120 to detected objects. For example, other vehicles or other people captured in the frame may be compared to known or average sizes of such objects to then infer a distance in the image to a particular detected object. Other methods of determining a distance to an object in a captured image could be used as well. On the other hand, for emission and detection systems such as LiDAR and RADAR, time of flight information measured from the time of emission to the time of detection, and knowledge/pre-configuration of the speed of such emissions through air, may be used to directly calculate an estimated distance from the vehicle 102 or the 360-degree threat detection sensor system 120 to detected objects. In accordance with some embodiments, the distance to the detected object is used to determine whether the object is a threat to the officer 104 associated with the vehicle 102. In some embodiments, the distance to the detected object is also used to compute a potential vehicle stop location (e.g., a distance and direction to move the vehicle 102) that would enable the 360-degree threat detection sensor system to have an unobstructed field-of-view of an area of interest that is obstructed by the detected object.

External lights 122, 124 may be any type of externally-perceivable visible lights and may include an underlying LED, incandescent, and/or halogen lamp whose light output is constant and unidirectional or which may be modulated into a strobe, directional rotating, blinking, or otherwise non-static and/or focused output, and may comprise a white or colored (e.g., red, blue, etc.) light. While external lights 122, 124 are depicted in FIG. 1 as separately placed individual lights, in other embodiments, light bars that span substantially the entire width of the roof of the vehicle 102 with a number of same or different sized and/or colored lights in various matrix arrays may be included as well.

External speaker 126 is a speaker, such as a horn or siren, including an amplifier that broadcasts an externally-perceivable audio output such as a public safety tone, series of tones, or spoken words that may be perceived by other officers, civilians, or suspects nearby while outside of the vehicle 102. In some embodiments, and similar to the internal speaker 109, the external speaker 126 may be replaced with a plurality of speakers displaced throughout the external body of the vehicle 102 and selectively enabled in accordance with a detected approaching threat surrounding the vehicle 102 such that a particular one of the plurality of speakers closest to the detected approaching threat is selected to playback a tone, spoken notification, or other type of speech output to indicate a relative direction of the approaching threat or alternatively to instruct the officer 104 to move the vehicle 102 to a new stop location to enable the 360-degree threat detection sensor system to monitor an area of interest which is obstructed due to one or more objects surrounding the vehicle's 102 current stop location. In still other embodiments, a physical pan, tilt mechanism may be used to effect directionality of sound emitting from directional external speaker 126, while in other embodiments, a plurality of speakers in a matrix configuration may be used to beam steer audio output from the external speaker 126 to a particular location commensurate with the location of the approaching threat or the location of the officer 104. Other possibilities exist as well.

Infrastructure RAN 152 may implement over wireless link(s) 140 a narrowband wireless system such as a conventional or trunked LMR standard or protocol, which may include an ETSI DMR, a P25 standard defined by the APCO, TETRA, or other LMR radio protocols or standards. In other embodiments, infrastructure RAN 152 may additionally or alternatively implement over wireless link(s) 140 a broadband wireless system such as an LTE protocol including MBMS, an OMA-PoC standard, a VoIP standard, or a PoIP standard. In still further embodiments, infrastructure RAN 152 may additionally or alternatively implement over wireless link(s) 140 a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of wireless protocols could be implemented as well.

The infrastructure RAN 152 is illustrated in FIG. 1 as providing communication coverage for the vehicle 102 and its occupants via a single fixed terminal 154 coupled to a controller 156 (e.g., radio controller, call controller, PTT server, zone controller, MME, BSC, MSC, site controller, Push-to-Talk controller, or other network device) and including a dispatch console 158 operated by a dispatcher. In other embodiments, more or different types of fixed terminals may provide RAN services to the vehicle 102 and vehicle occupants and may or may not contain a separate controller 156 and/or dispatch console 158.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half-duplex mobile devices, but uses mobile devices operating over modern broadband telecommunications networks. Using OMA-PoC, wireless mobile devices such as mobile telephones and notebook computers can function as PTT half-duplex mobile devices for transmitting and receiving. Other types of PTT models and multimedia call models (MMCMs) could be used as well.

Floor control in an OMA-PoC session is generally maintained by a PTT server that controls communications between two or more wireless mobile devices. When a user of one of the mobile devices keys a PTT button, a request for permission to speak in the OMA-PoC session is transmitted from the user's mobile device to the PTT server using, for example, a real-time transport protocol (RTP) message. If no other users are currently speaking in the PoC session, an acceptance message is transmitted back to the user's mobile device and the user can then speak into a microphone of the device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other mobile devices in the group of mobile devices or talkgroup to which the user is subscribed), using for example, one or more of a unicast, point to multipoint, or broadcast communication technique.

Infrastructure LMR wireless systems, on the other hand, may operate in either a conventional or trunked configuration. In either configuration, a plurality of mobile devices is partitioned into separate groups of mobile devices. In a conventional narrowband radio system, each mobile device in a group is selected to a particular radio channel (frequency or frequency & time slot) for communications associated with that mobile device's group. Thus, each group is served by one channel, and multiple groups may share the same single frequency (in which case, in some embodiments, group IDs may be present in the group data to distinguish between groups using the same shared frequency).

In contrast, a trunked narrowband radio system and its mobile devices use a pool of traffic channels for virtually an unlimited number of groups of mobile devices (e.g., talkgroups). Thus, all groups are served by all channels. The trunked radio system works to take advantage of the probability that not all groups need a traffic channel for communication at the same time. When a member of a group requests a call on a control or rest channel on which all of the mobile devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the mobile devices were idling to a traffic channel for the call, and instruct all mobile devices that are not participating in the new call to move to a newly assigned control or rest channel selected from the pool of available channels. With a given number of channels, a much greater number of groups can be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., mobile devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, mobile devices may dynamically affiliate with a group (and also disassociate with the group) perhaps based on user input, and the switching and/or radio network may track group membership and route new group calls according to the current group membership.

The controller 156 illustrated in FIG. 1, or some other backend electronic computing device existing on-premises or in the remote cloud compute cluster 160 accessible via an IP network (such as the Internet), may additionally or alternatively operate as a back-end electronic digital assistant, a back-end audio and/or video processing electronic computing device, and/or a remote cloud-based storage device consistent with the remainder of this disclosure.

In accordance with embodiments, when it is determined that one or more objects surrounding the vehicle 102 (e.g., when the vehicle 102 is parked/stopped at a particular vehicle stop location) precludes (i.e., by obstructing the field-of-view) the 360-degree threat detection sensor system 120 from monitoring a selected area of interest surrounding the vehicle's 102 current stop location, an instruction is automatically generated to cause the vehicle 102 to be re-located to a new vehicle stop location that would enable the 360-degree threat detection sensor system to have an unobstructed field-of-view of the selected area of interest. In some embodiments, the vehicular computing device 108 receives the instruction and autonomously controls the vehicle 102 (for example, by enabling self-driving mode) to move the vehicle 102 from the vehicle's 102 current stop location and further stop/park the vehicle 102 at the new vehicle stop location. In other embodiments, the instruction to move the vehicle 102 to the new vehicle stop location may be provided as an electronic indication to the officer 104, for example, via one of officer's personal radio communication device 105, vehicular computing device 108, internal speaker 109, speaker 126, and other electronic output devices that are accessible to the officer 104.

Figure 2:
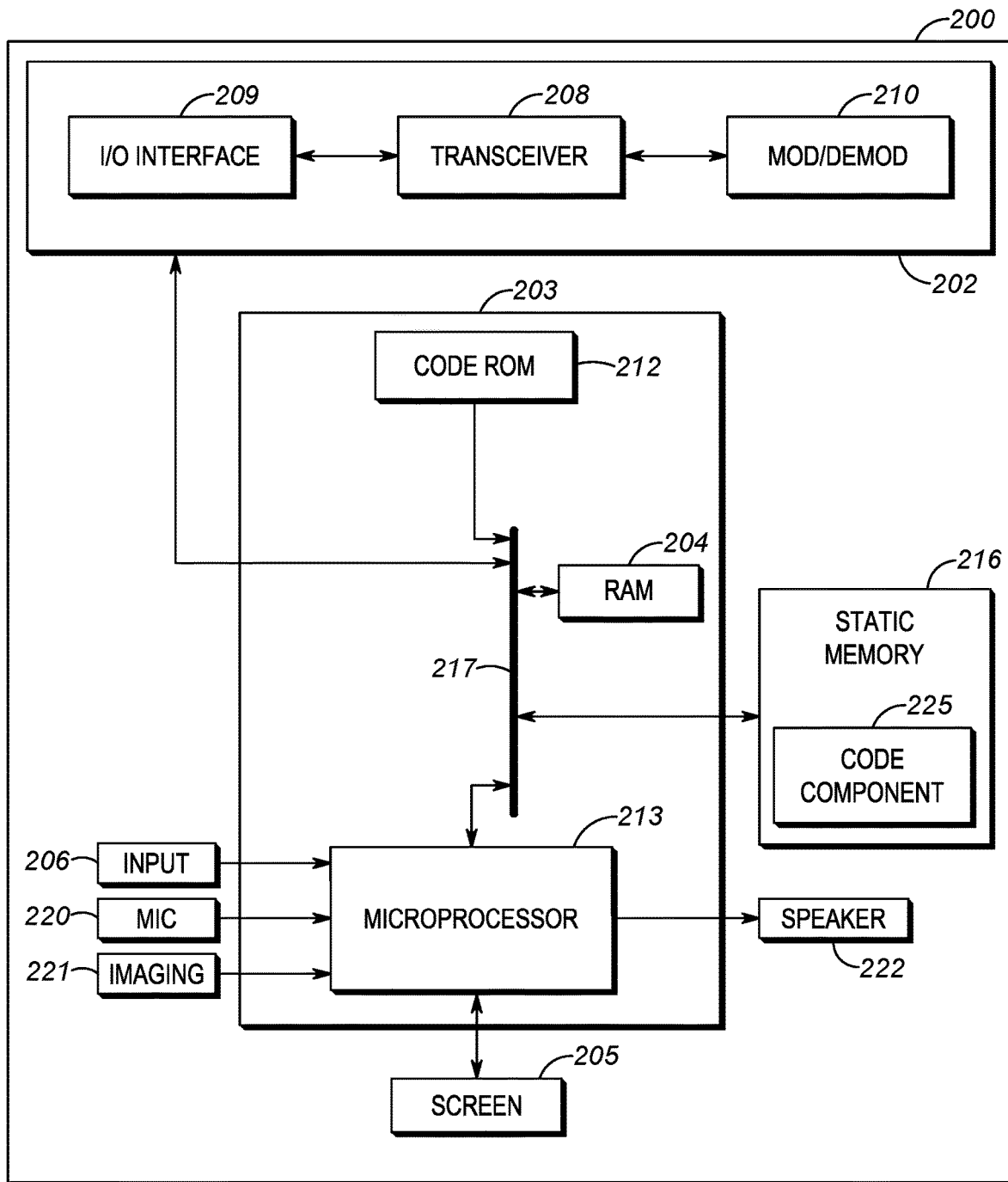
FIG. 2 is a device diagram showing a device structure of an electronic computing device for enabling a 360-degree threat detection sensor system to monitor an area of interest surrounding a vehicle, in accordance with some embodiments.

Now referring to FIG. 2, a schematic diagram illustrates an electronic computing device 200 according to some embodiments of the present disclosure. The electronic computing device 200 may be, for example, embodied in the personal radio communication device 105, the vehicular computing device 108, the integrated vehicular appliance 120, the infrastructure controller 156, the dispatch console 158, one or more computing devices in the cloud computing cluster 160, or some other communication device not illustrated in FIG. 1, and/or may be a distributed communication device across two or more of the foregoing (or multiple of a same type of one of the foregoing) and linked via a wired and/or wireless communication link(s), and may also be referred to herein as an electronic processing system.

While FIG. 2 may represent the devices as described above with respect to FIG. 1, depending on the type of the device, the electronic computing device 200 or other devices may include fewer or additional components in configurations different from that illustrated in FIG. 2. For example, in some embodiments, the electronic computing device 200 acting as the infrastructure controller 156 of FIG. 1 may not include one or more of the screen 205, microphone 220, imaging device 221, and speaker 222. As another example, in some embodiments, the electronic computing device 200 acting as the radio communication device 105 or vehicular computing device 108 of FIG. 1 may further include a location determination device (for example, a global positioning system (GPS) receiver or local RF triangulation techniques using BT BTLE, WiFi, UWB, 4G/5G PoLTE, etc.). As still another example, in some embodiments, the electronic computing device 200 acting as the integrated vehicular appliance/360-degree threat detection sensor system 120 of FIG. 1 may not include the microphone input 220, the screen 205, the user interface input 206, and the speaker 222. Other combinations are possible as well.

As shown in FIG. 2, the electronic computing device 200 includes a communications unit 202 coupled to a common data and address bus 217 of a processing unit 203. The electronic computing device 200 may also include one or more input devices (for example, keypad, pointing device, touch-sensitive surface, button, a microphone 220, an imaging device 221, and/or a user input interface device 206) and an electronic display screen 205 (which, in some embodiments, may be a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) or radio echo maps or point cloud maps of an area in a field-of-view of the electronic computing device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the electronic computing device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the radio communication device 105, the wireless RAN 152, and/or the vehicular computing device 108, over which incoming calls may be received and over which communications with remote databases and/or servers may occur. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the user input interface device 206, and/or the speaker 222. Static memory 216 may store operating code 225 for the electronic processor 213 that, when executed, performs one or more of the blocks set forth in FIG. 3 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

In examples set forth herein, the electronic computing device 200 is not a generic computing device, but a device specifically configured to implement functionality of determining a vehicle stop location to monitor an area of interest surrounding the vehicle 102. For example, in some embodiments, the electronic computing device 200 specifically comprises a computer executable engine configured to implement functionality of enabling a 360-degree threat detection sensor system 120 physically coupled to a vehicle 102 to monitor an area of interest surrounding the vehicle 102.

Figure 3:
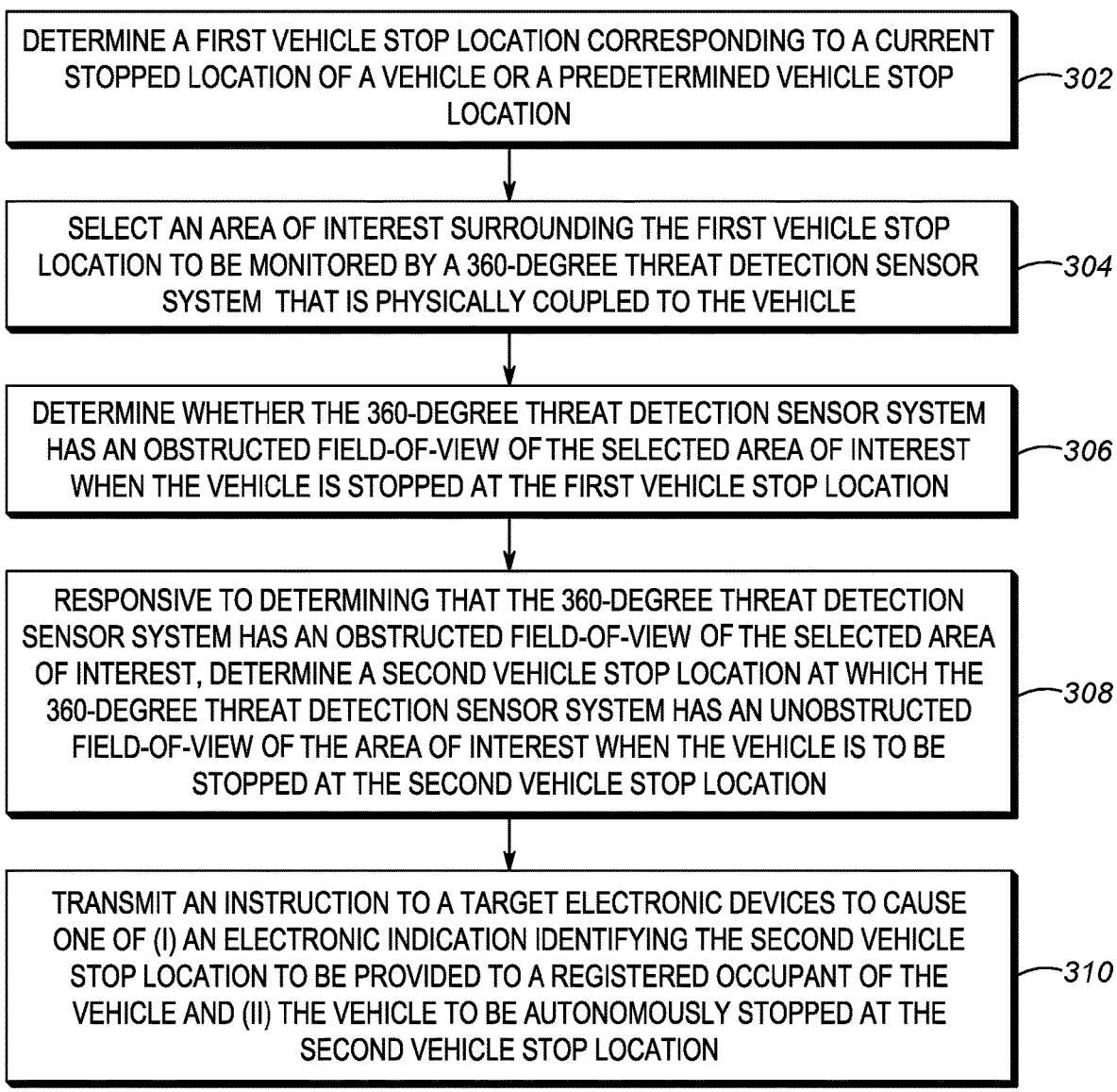
FIG. 3 illustrates a flow chart setting forth process blocks for enabling a 360-degree threat detection sensor system to monitor an area of interest surrounding a vehicle, in accordance with some embodiments.

Turning now to FIG. 3, a flowchart diagram in FIG. 3 illustrates a process 300 for enabling a 360-degree threat detection sensor system 120 to monitor an area of interest surrounding a vehicle 102. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. A corresponding electronic computing device, such as the vehicular computing device 108 of FIG. 1 and/or the electronic computing device 200 of FIG. 2, and embodied as a singular electronic computing device or distributed electronic computing device making up an electronic processing system as set forth earlier, may execute process 300.

The process 300 of FIG. 3 need not be performed in the exact sequence as shown and likewise various blocks may be performed in different order or alternatively in parallel rather than in sequence. Accordingly, the elements are referred to herein as "blocks" rather than "steps." The process 300 may be implemented on variations of the system 100 of FIG. 1 as well.

Process begins at block 302 where the electronic computing device determines a first vehicle stop location that corresponds to one of a current stopped location of a vehicle 102 or a predetermined vehicle stop location. The current stopped location refers to a location and a direction at which the vehicle 102 has been detected as stopped and/or parked. As one example, the current stopped location of the vehicle 102 could be determined by the electronic computing device itself based on a current location determining function such as by receiving current GPS coordinates from an integrated or communicatively coupled GPS receiver circuit, or perhaps via a triangulation function in cooperation with two or more communication towers or other radio emitting devices detected at the electronic computing device via a receiver or transceiver circuit integrated with or communicatively coupled to the electronic computing device. In still further embodiments, image or video analytics operating at a coupled image capture device such as one operating at the integrated vehicular appliance 120 of FIG. 1 may recognize cross-streets, or building addresses or business names, that can be associated with a current vehicle destination location of the vehicle 102. In accordance with some embodiments, a detected stopping of the vehicle 102 detected via a gyroscope-based motion sensing device integrated in the vehicular computing device 108 or communicatively coupled to the electronic computing device, or a detected placement of the vehicle transmission into park, may then trigger the electronic computing device to enable the 360-degree threat detection sensor system 120 to monitor an area of interest surrounding the vehicle 102 by determining an optimal stop location for the vehicle 102 that would allow the 360-degree threat detection sensor system to have an unobstructed field-of-view of the area of interest to be monitored.

In still other embodiments, the electronic computing device may receive an indication of a predetermined stop location for the vehicle 102 such as via a detected entry (e.g., user entry such as by officer 104 of FIG. 1) of an intended vehicle stop location at the electronic computing device or at another computing device in the vehicle 102 that then provides the indication of the first vehicle stop location to the electronic computing device via a wired or wireless communication link. In still other embodiments, the electronic computing device may receive an indication of an assigned incident for the vehicle 102 or officer 104 to respond to, and may use a location of the assigned incident (for example, provided to the vehicular computing device 108 from dispatch console 158 via RAN 152) included in the indication or otherwise separately provided or determined via a request for a location of the incident, to identify the first vehicle stop location for the vehicle 102. Other examples are possible as well.

Processing then proceeds to block 304, where the electronic computing device, in response to determining a first vehicle stop location corresponding to one of a current stopped location or a predetermined vehicle stop location, selects an area of interest surrounding the first vehicle stop location to be monitored by the 360-degree threat detection sensor system 120 that is physically coupled to the vehicle 102. In one embodiment, the area of interest may be selected by the electronic computing device after determining that a particular area of interest (for example, in accordance with the block 306) is obstructed by one or more physical features surrounding the vehicle 102. In other embodiments, the area of interest may be selected (e.g., by the occupant of the vehicle 102) prior to determining whether the area of interest is obstructed by physical features surrounding the vehicle 102.

In accordance with some embodiments, the electronic computing device may generate a virtual boundary surrounding the first vehicle stop location based on a detection range ($D_R$) of the 360-degree threat detection sensor system 120 that is physically coupled to the vehicle 102. The detection range indicates a viable distance from the vehicle 102 within which the 360-degree threat detection sensor system 120 can accurately monitor and detect an approaching threat when the 360-degree threat detection sensor system 120 has an unobstructed field-of-view of the areas surrounding the vehicle 102. The electronic computing device may use pre-generated two-dimensional or three-dimensional map data (e.g., map data stored at the static memory 216) in combination with the real-time data produced (e.g., point cloud data) by the electronic ranging devices associated with the 360-degree threat detection sensor system 120 to identify different physical features and layout of the geographical region surrounding the vehicle 102 for the purposes of this process 300. Then the electronic computing device may instruct the mapping application included in the personal radio communication device 105 or vehicular computing device 108 to visually display the virtual boundary encompassing the different identified areas and physical features surrounding the vehicle 102 that are within the detection range of the 360-degree threat detection sensor system 120.

In one embodiment, the electronic computing device receives a user input selecting one or more areas of interest from the identified areas within the virtual boundary. For example, the user such as the officer 104 may interact with the mapping application provided at the radio communication device 105 or vehicular computing device 108 to select (e.g., by highlighting, selecting, or drawing over an area on the map) one or more areas of interest (e.g., a particular travel path toward the vehicle 102) within the virtual boundary. In this case, the electronic computing device selects the area of interest based on the manual input received from the user.

In accordance with some embodiments, the electronic computing device automatically selects an area of interest based on a priority score assigned to the different areas encompassed by the virtual boundary. In these embodiments, the electronic computing device assigns a priority score to each of the identified areas in the virtual boundary based on one or more threat risk parameters associated with the respective one of the areas. The electronic computing device selects a particular area to be the area of interest when the particular area has a priority score that is higher than the priority scores assigned to the other areas surrounding the vehicle 102. In some embodiments, the electronic computing device may select two or more different areas to be the areas of interest, for instance, when one or more of the following conditions are satisfied: (i) two or more areas have the same priority score; (ii) the priority scores for two or more areas are higher than a score threshold that is defined by the officer 104 or at the dispatch console 158 for the purpose of selecting the areas of interest; and (iii) a user input is received selecting two or more areas to be the areas of interest.

The threat risk parameters associated with each area of interest are selected based on one or more of: (i) geographical features of the area, including, but not limited to shape, size, and dimensions of the area, objects that are detected as being placed in or around the areas, dimensions of the objects, positions of the objects relative to the 360-degree threat detection sensor system 120, and open space around the area; (ii) density of current or historical human presence in the area; (iii) historical incidents and/or historical threats detected in the area; (iv) surveillance coverage status for the area indicating whether the area is capable of being surveilled or currently surveilled through one or more of fixed surveillance cameras and sensors; (v) field-of-view status of other vehicles relative to the areas of interest, indicating whether 360-degree threat detection sensor systems 120 that are physically coupled to one or more other vehicles 102 in the system 100 have an unobstructed field-of-view of the area, and (vi) field-of-view status of the officer 104 or officer's 104 partner associated with the vehicle 102, indicating whether the officer 104 or officer's 104 partner (or associated body-worn camera) has an unobstructed field-of-view in the area from their respective positions. The electronic computing device may access the threat risk parameters from a threat risk parameter database stored at the static memory 216 or the cloud compute cluster 160 for computing a priority score to the identified areas.

In accordance with some embodiments, each threat risk parameter that is used to compute the priority score for an area is weighted differently. For example, an area corresponding to a narrow space in a path toward the vehicle 102 may be weighted higher than an area with wide open space. In situations like stakeout, there may be a known direction the officer 104 will be looking more, and thus, the direction known to the officer will be weighted lower. Similarly, a blind spot area that cannot be manually monitored by the officer 104 or officer's 104 partner may be assigned higher weight than an area which is under direct line-of-sight of the officer 104 or officer's 104 partners. For example, the priority score (P) for each distinct area surrounding the vehicle 102 can be calculated using a mathematical function: P=w1*(measure of open space around the area)+w2*(radial distance from direction the officer is looking when seated in the vehicle 102)+w3*(radial distance from a stakeout target)+w4*(radial distance from view of nearby partners)+w5*(known space of past incidents)+w6*(history of density of human activity), where w1, w2, w3, w4, w5, w6 represent the weights that are assigned to the respective threat risk parameters. The above mathematical function is provided as an example and variations in the mathematical function can be performed by adding and/or removing one or more threat risk parameters.

Next at block 306, after selecting at least one area of interest surrounding the first vehicle stop location either automatically based on priority score or based on user input, the electronic computing device determines whether the 360-degree threat detection sensor system 120 has an obstructed field-of-view of the selected area of interest when the vehicle 102 is stopped at the first vehicle stop location. The term "obstructed field-of-view" indicates that a real-world geographical space (e.g., a travel path toward the vehicle 102) corresponding to the selected area of interest is obstructed by one or more detected objects, thereby precluding the 360-degree threat detection sensor system 120 from scanning the real-world geographical space (e.g., using the electronic ranging devices) for detecting threats approaching the vehicle 102 from the selected area of interest. In some cases, the real-world geographical space corresponding to the area of interest may be within the detection range of the 360-degree threat detection sensor system 120, but are obstructed by one or more physical features (e.g., trees, vehicles, buildings etc.) that are placed relative to the area of interest, thereby causing the 360-threat detection sensor system 120 to have an obstructed field-of-view of the selected area of interest.

The electronic computing device may determine that the 360-degree threat detection sensor system 120 has an obstructed field-of-view of the selected area of interest using various methods. In one method, the electronic computing device, in response to detecting that the vehicle 102 is currently stopped at the first vehicle stop location, defines a virtual boundary surrounding the first vehicle stop location based on a detection range, $D_R$ of the 360-degree threat detection sensor system 120. The electronic computing device then detects one or more physical features such as building and objects placed within the virtual boundary surrounding the first vehicle stop location. For example, the physical features within the virtual boundary can be detected in real-time by means of one or more electronic ranging devices such as the integrated vehicular appliance 120 of FIG. 1. The electronic computing device may, additionally or alternatively, use a pre-generated map that is stored at the static memory 216 to identify one or more objects (and the corresponding positions) that were previously known to be present in the geographical area encompassed by the virtual boundary. The electronic computing device then identifies areas within the virtual boundary that are obstructed by the one or more detected physical features. The electronic computing device may also determine that there is an obstructed area (i.e., an area for which the 360-degree threat detection sensor system 120 has an obstructed field-of-view) based on the distance between the detected physical feature and the vehicle's 102 current stopped location. For example, the electronic computing device may generate an output indicating that the 360-degree threat detection sensor system 120 has an obstructed field-of-view of the area relative to the detected physical feature if the distance between the detected physical feature and the vehicle's 102 current stopped location is smaller than a distance corresponding to the detection range ($D_R$) of the 360-degree threat detection sensor system 120.

The electronic computing device further determines that the 360-degree threat detection sensor system 120 has an obstructed field-of-view of the selected area of interest when the selected area of interest overlaps with one or more of the areas that are identified and further mapped as obstructed areas within the virtual boundary. In some embodiments, the electronic computing device also visually demonstrates a field-of-view coverage of the 360-degree threat detection sensor system 120 for the area encompassed by the virtual boundary that is generated based on the first vehicle stop location. For example, the electronic computing device displays a map view that visually distinguishes the one or more identified areas i.e., areas that are obstructed by detected physical features, from other areas that are not obstructed by the detected physical features.

In one embodiment, the electronic computing device determines that the 360-degree threat detection sensor system 120 does not have an obstructed field-of-view of the selected area of interest when the selected area of interest does not overlap with one or more of the areas that are identified and mapped as obstructed areas within the virtual boundary. Accordingly, when the electronic computing device determines that the 360-degree threat detection sensor system 120 does not have an obstructed field-of-view of the selected area of interest, the electronic computing device proceeds to monitor the selected area of interest for detecting threats approaching the vehicle 102, for example, by enabling the 360-degree threat detection sensor system 120 to scan the selected area of interest. In accordance with some embodiments, the 360-degree threat detection sensor system 120 captures the 360-degree field-of-view data corresponding to the area of interest to be monitored and further transmits it to the electronic computing device for further processing. The electronic computing device in turn processes the data captured by the 360-degree threat detection sensor system 120 to detect objects that are approaching the vehicle from the area of interest and further determine whether the detected object is to be classified as an approaching threat. In accordance with embodiments, image or video analytics applications operating at the electronic computing device or cloud compute cluster 160 may be used to process the data captured by the 360-degree threat detection sensor system and further detect objects and/or classify objects as threats based on the processed data.

Next at block 308, when it is determined that the 360-degree threat detection sensor system 120 has an obstructed field-of-view of the selected area of interest, the electronic computing device determines a new stop location (i.e., a second vehicle stop location) for the vehicle 102 at which the 360-degree threat detection sensor system 120 has an unobstructed field-of-view of the selected area of interest when the vehicle 102 is to be stopped at the new stop location. The term "unobstructed field-of-view" indicates that the real-world geographical space corresponding to the area of interest can be optimally scanned by the 360-degree threat detection sensor system 120 (e.g., using the visible light imaging devices 120A-C and active scanning RADAR emitter and detector 120D) for threats approaching the vehicle 102 from the selected area of interest. In accordance with some embodiments, the electronic computing device determines the second vehicle stop location based on a position (e.g., location coordinate) of the one or more physical features (e.g., objects that are identified as obstructing the selected area of interest) and a position (e.g., location coordinate corresponding to the first vehicle stop location) of the 360-degree threat detection sensor system 120. For example, assume that the 360-degree sensor detection has an obstructed field-of-view of an area of interest that is located between two adjacent physical structures (e.g., an apartment building and a store building). In this example, the electronic computing device determines the positions of the two physical structures relative to the position of the 360-degree threat detection sensor system 120. The electronic computing device then determines the second vehicle stop location by computing a distance and direction to be moved by the vehicle 102 in order to place the 360-degree threat detection sensor system 120 at a new position at which the 360-degree threat detection sensor system 120 has an unobstructed field-of-view of the area of interest that is located between the two adjacent structures.

In one embodiment, the electronic computing device generates a coordinate system to map the respective positions of two physical features relative to a current position of the 360-degree threat detection sensor system 120. For example, the distance is computed using a mathematical function: $N=y1+(y2-y1)/2$, wherein 'N' represents an unit of the distance to be moved by the vehicle 102, 'y1' represents an ordinate value (y-axis value) corresponding to the position of the first physical feature when the current position of the 360-degree threat detection sensor system 120 is plotted at the origin of the coordinate system, and 'y2' represents an ordinate value (y-axis value) corresponding to the position of the second physical feature when the current position of the 360-degree threat detection sensor system 120 is plotted at the origin of the coordinate system. The electronic computing device then determines a second vehicle stop location based on the computed distance and direction to be moved by the vehicle 102. In some embodiments, the electronic computing device also takes into account additional factors such as suitability of the area (corresponding to the new stop location that is calculated as a function of the distance and direction) for stopping/parking the vehicle 102. For example, when the area is determined to be not suitable for stopping/parking the vehicle 102 or alternatively when parking rules indicate that the area is not pre-designated for parking, the electronic computing device may re-compute the distance and therefore determine another vehicle stop location that is suitable/allowable for parking/stopping the vehicle 102 and to further allow the 360-degree threat detection sensor system 120 to have unobstructed field-of-view of the selected area of interest when the vehicle 102 is to be stopped at the another vehicle stop location.

Next, at block 310, the electronic computing device transmits an instruction to one or more target electronic devices to cause one of (i) an electronic indication identifying the second vehicle stop location to be provided to a registered occupant of the vehicle 102, and (ii) the vehicle 102 to be autonomously stopped at the second vehicle stop location. The target electronic device may be one of personal radio communication device 105, vehicular computing device 108, internal speaker 109, external speaker 126, and vehicular computing device 108. For example, a navigation application running at the target electronic device may generate a navigation route based on the instruction received from the electronic computing device to enable the registered vehicle occupant to move and stop the vehicle 102 at the second vehicle stop location. As another example, the internal speaker 109 and/or external speaker 126 may provide an audible output indicating to the registered vehicle occupant to move the vehicle 102 from the first vehicle stop location and further stop/park at the second vehicle stop location. Alternatively, the vehicular computing device 108 may control the vehicle 102 to autonomously move the vehicle 102 from the first vehicle stop location and further automatically stop the vehicle 102 at the second vehicle stop location.

In one embodiment, the electronic computing device provides an initial electronic indication to the occupant of the vehicle 102 to move the vehicle 102 in a given direction (e.g., a forward or reverse direction that is determined based on the second vehicle stop location) from a current location (e.g., first vehicle stop location) of the vehicle 102 and further when it is determined that the vehicle 102 is about to reach the second vehicle stop location, the electronic computing device provides another electronic indication to the occupant of the vehicle 102 to stop the vehicle 102 at the second vehicle stop location.

In accordance with some embodiments, when the electronic computing device detects that the vehicle 102 has stopped at the second vehicle stop location, the electronic computing device enables the 360-degree threat detection sensor system 120 to scan the selected area of interest for the purposes of detecting threats approaching the vehicle 102 and/or the officer 104 from the selected area of interest. In accordance with some embodiments, the 360-degree threat detection sensor system 120 captures the 360-degree field-of-view data corresponding to the area of interest to be monitored and further transmits it to the electronic computing device for further processing. The electronic computing device in turn processes the data captured by the 360-degree threat detection sensor system 120 to detect objects that are approaching the vehicle from the area of interest and further determine whether the detected object is to be classified as an approaching threat. In accordance with embodiments, image or video analytics applications operating at the electronic computing device or cloud compute cluster 160 may be used to process the data captured by the 360-degree threat detection sensor system and further detect objects and/or classify objects as threats based on the processed data.

In one embodiment, when the user input indicates selection of two or more areas of interest or alternatively when the electronic computing device selects two or more areas of interest (at block 304) based on the assigned priority scores being higher than a defined priority threshold, the electronic computing device determines one vehicle stop location that would allow the 360-degree threat detection to have an unobstructed field-of-view of each of the two or more selected areas of interest. In case, a single vehicle stop location is not optimal for the 360-degree threat detection sensor system 120 to simultaneously have an unobstructed field-of-view of each of the two or more areas of interest, the electronic computing device may transmit an instruction to cause the vehicle 102 to autonomously (or via human operation) move between two or more determined vehicle stop locations (e.g., the first vehicle stop location and the second vehicle stop location) at periodic intervals to enable the 360-degree threat detection sensor system to have an unobstructed field-of-view of each of the two or more areas of interest when the vehicle 102 is respectively stopped at each of the two or more determined stop locations. In one embodiment, the instruction transmitted by the electronic computing device may further cause the vehicle 102 to autonomously reduce (e.g., lower than 5 miles/hour) the speed as the vehicle 102 approaches the first or second vehicle stop locations while moving between the two or more vehicle stop locations. In accordance with some embodiments, reducing the speed of the vehicle 102 as the vehicle 102 approaches each stop location allows the 360-degree threat detection sensor system 120 to have an unobstructed field-of-view (for example, without the vehicle 102 being necessarily stopped at the determined stop locations) in the corresponding area of interest when the vehicle 102 moves between the locations.

Figure 4A:
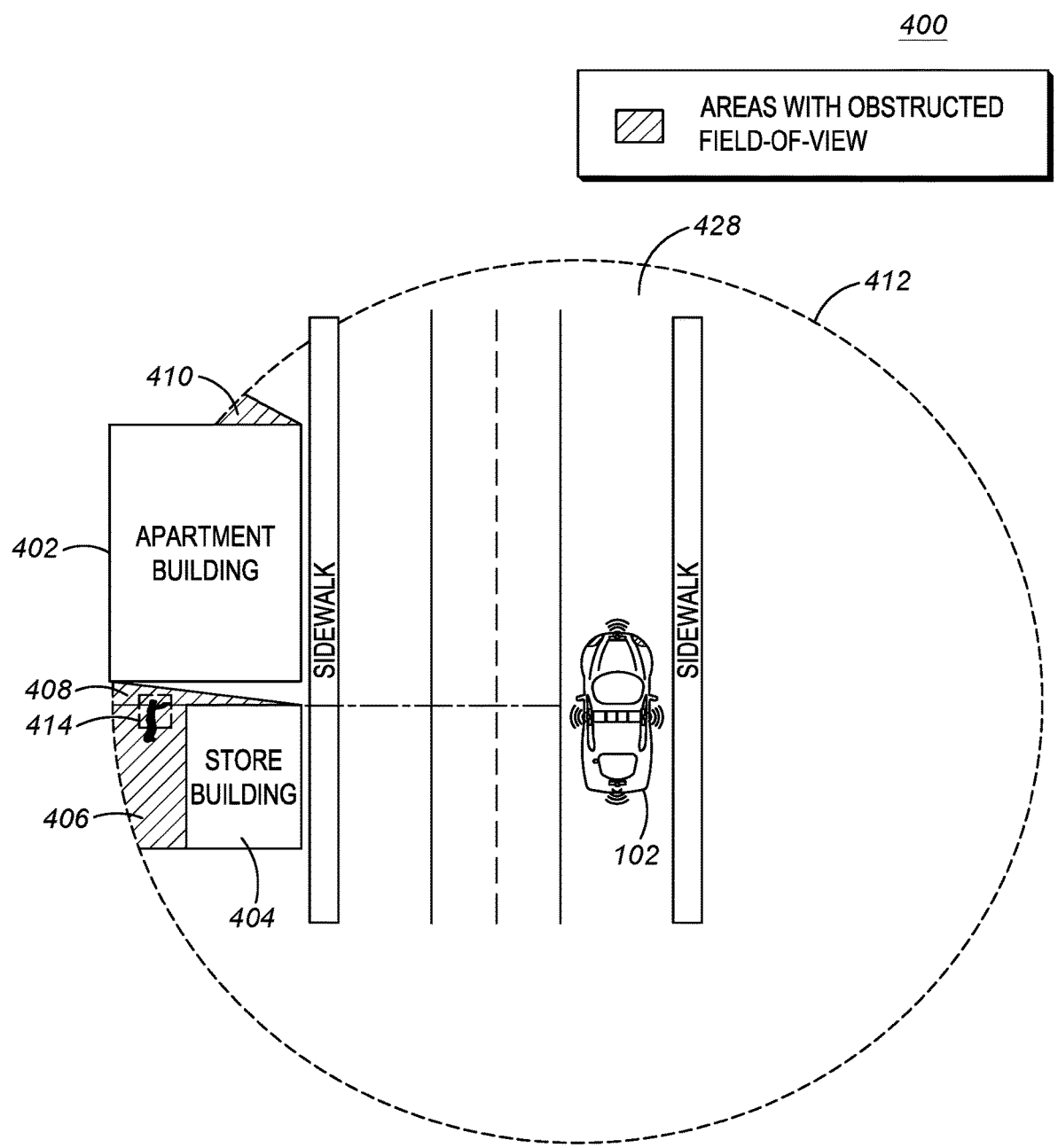
FIGS. 4A, 4B, and 4C illustrate a first example scenario for enabling a 360-degree threat detection sensor system to monitor an area of interest surrounding a vehicle.
Figure 4B:
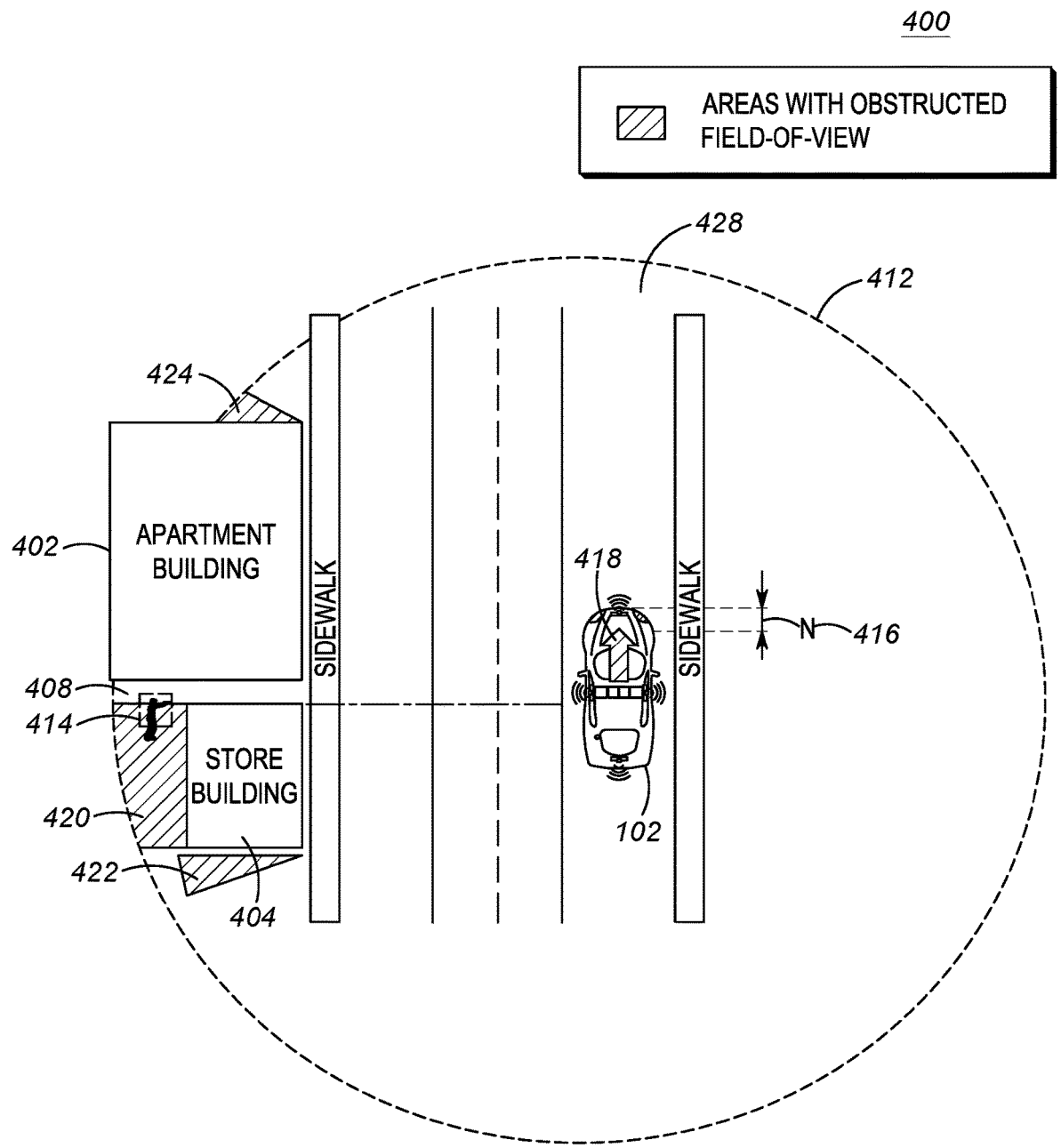

FIGS. 4A and 4B illustrate a first example scenario of enabling a 360-degree threat detection sensor system to monitor an area of interest surrounding a vehicle. To illustrate the first example scenario 400, a vehicle 102 is shown in FIG. 4A as parked on the side of a street and further two physical structures (an apartment building 402 and a store building 404) are shown as being located opposite to the side of the vehicle 102 on the other end of the street. In this example scenario, the electronic computing device may begin the process 300 of enabling the 360-degree threat detection sensor system 120 to monitor an area of interest either in response to detecting that the vehicle 102 has been stopped at a particular location for a threshold duration of time or alternatively based on user input (e.g., a dedicated hard or soft button may be provided at the vehicle 102 or at an electronic device associated with the vehicle to enable the user to trigger the process 300). As described above with reference to block 302, the electronic computing device determines the current stopped location of the vehicle 102 in response to a detected stopping of the vehicle 102 or alternatively in response to receiving user input.

The electronic computing device selects an area of interest surrounding the vehicle's 102 current stopped location for which the 360-degree threat detection sensor system 120 is to be enabled for detecting threats approaching the vehicle 102. The area of interest is selected commensurate with block 304 shown in FIG. 3. As shown in FIG. 4A, the electronic computing device identifies three different areas 406, 408, and 410 that are located within a virtual boundary 412 that is defined based on a detection range of the 360-degree threat detection sensor system 120. The area 406 is located behind the store building 404, the area 408 (e.g., alley) is located between the side walls of the two adjacent building structures i.e. of the apartment building 402 and the store building 404, and the area 410 is located adjacent to the other side wall of the apartment building 402. In this example, the areas 406, 408, and 410 correspond to areas for which the 360-degree threat detection sensor system 120 has an obstructed field-of-view. In accordance with some embodiments, the electronic computing device may display a map view (e.g., at the officer's personal radio communication device 105 or vehicular computing device 108) corresponding to the virtual boundary 412. The map view may further visually distinguish the areas (e.g., areas 406, 408, 410) that are obstructed by objects (identified as surrounding the vehicle 102 at the vehicle's 102 current stopped location) and for which the 360-degree threat detection sensor system 120 has an obstructed field-of-view, from other areas (e.g., area 428) for which the 360-degree threat detection sensor has an unobstructed field-of-view.

As described above with reference to block 304 shown in FIG. 3, the electronic computing device may assign priority score to each of the areas 406, 408, and 410 based on one or more threat risk parameters. In the example scenario 400 shown in FIG. 4A, the area 408 has an open space and further has an available path toward the vehicle 102, and therefore there is a high likelihood of threat (e.g., person 414) approaching the vehicle 102 from the area 408 in comparison to likelihood of threat approaching directly from the areas 406 and 410. For instance, there is a less likelihood of any threat directly approaching the vehicle 102 from the area 406 because the area is completed blocked by the physical structure corresponding to the store building 404 and therefore the 360-degree threat detection sensor system's 120 obstructed field-of-view of the area 406 may not affect the accuracy of threat detection process. Accordingly, based on the one or more threat risk parameters, the electronic computing device may select area 408 to be the area of interest for the purposes of enabling the 360-degree threat detection sensor system to monitor the area 408. In the example scenario, the electronic computing device further determines, as described with reference to block 306 shown in FIG. 3, that the 360-degree threat detection sensor system 120 has an obstructed field-of-view of the area 408. This obstructed field-of view is due to the area 408 being blocked by the positioning of the 360-degree threat detection sensor system 120 at the vehicle's 102 current stopped location relative to the positioning of the two identified adjacent building structures, i.e., apartment building 402 and store building 404. Accordingly, in this case, the electronic computing device is required to determine a new vehicle stop location for the vehicle 102 in order to enable the 360-degree threat detection sensor system 120 to have an unobstructed field-of-view of the selected area 408.

In one example, the electronic computing device may select two or more areas of interest for monitoring and accordingly may either determine one single stop location for the vehicle 102 in order to enable the 360-degree threat detection sensor system 120 of the vehicle 102 to have an unobstructed field-of-view of all the selected areas of interest. In another example, the electronic computing device may determine two or more vehicle stop locations to allow the 360-degree threat detection sensor system 120 to have an unobstructed field-of-view of each of the two or more areas of interest while the vehicle 102 moves and stops between the two or more vehicle stop locations. In this example, the electronic computing device may, instead of causing the vehicle 102 to move between the locations, alternatively request for two or more vehicles 102 to be respectively stopped at each of the determined two or more vehicle stop location to allow the 360-degree threat detection sensor system 120 respectively associated with each of the vehicles 102 to monitor the respective two or more areas of interest.

Now referring to FIG. 4B, the electronic computing device causes the vehicle 102 to move to a new vehicle stop location, where the new vehicle stop location is determined in accordance with block 308, shown in FIG. 3. In one embodiment, the electronic computing device computes the new vehicle stop location by computing the distance 'N' 416 and further the direction 418 to be moved by the vehicle 102 in order for the 360-degree threat detection sensor system 120 that is physically coupled to the vehicle 102 to have an unobstructed field-of-view of the selected area 408. The location coordinate may then be determined using the computed distance and direction. The location coordinate corresponding to the new vehicle stop location is used to generate a navigation route and/or further autonomously control the vehicle 102 to be moved to the new vehicle stop location.

Figure 4C:
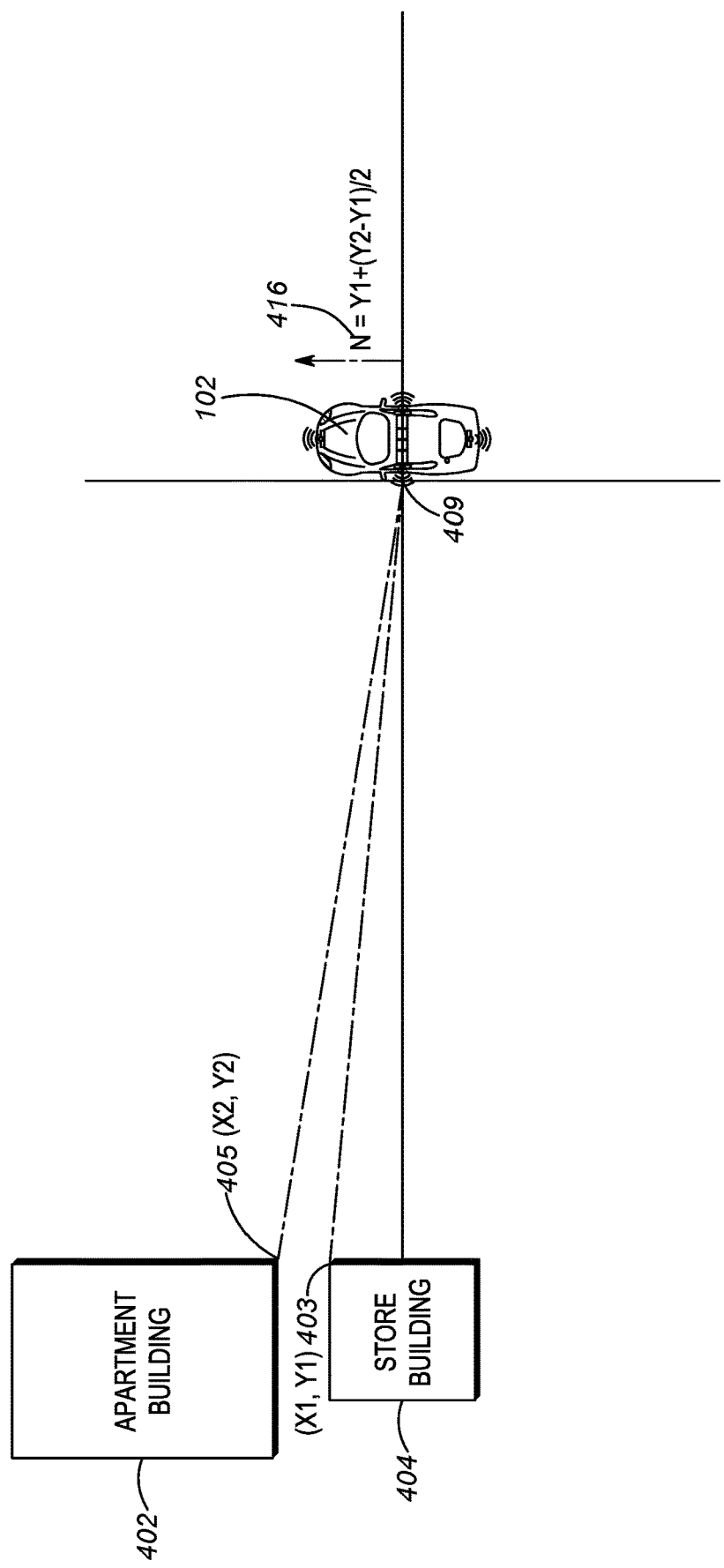

As an example, the distance to be moved by the vehicle 102 can be computed by plotting the coordinates of the positions of the detected physical structures and the vehicle's 102 current stopped location on a coordinate system. A graphical representation of the coordinate system is shown in FIG. 4C. Assume that a top edge 403 of the store building 404 is mapped with coordinates (x1, y1), a bottom edge 405 of the apartment building 402 is mapped with coordinates (x2, y2), and a position of the 360-degree threat detection sensor system 120 is mapped with coordinates (0, 0) i.e., at an origin 409 of the coordinate system. In this case, the distance may be calculated based on the mathematical function: N=y1+(y2−y1)/2, wherein 'N' represents an unit of the distance to be moved by the vehicle 102, 'y1' represents an ordinate value corresponding to the position of a physical feature associated with the top edge 403 of the store building 404 when the current position of the 360-degree threat detection sensor system 120 is plotted at the origin 409 of the coordinate system, and 'y2' represents an ordinate value corresponding to the position of a physical feature associated with the bottom edge 405 of the apartment building 402 when the current position of the 360-degree threat detection sensor system 120 is plotted at the origin 409 of the coordinate system.

Returning to FIG. 4B, when the vehicle 102 has moved the distance 416 in the determined direction 418 and further stopped at the new vehicle stop location in accordance with the instructions transmitted from the electronic computing device (see block 308, FIG. 3), the 360-degree threat detection sensor system 120 gains an unobstructed field-of-view of the area 408 of interest and is further able to capture 360-degree field-of-view of the entire travel path (including the previously obstructed area 408 of interest) that is located between the apartment building 402 and store building 404. Based on the captured field-of-view, the electronic computing device can detect any object (e.g., person 414) approaching the vehicle 102 from the area 408 and further determine whether the object can be classified as an approaching threat.

In some embodiments, the electronic computing device identifies and updates the virtual boundary 412 based on the vehicle's 102 new stopped location. The electronic computing device may further identify and display areas (e.g., areas 420, 422, 424 shown in FIG. 4B surrounding the vehicle 102 at the vehicle's 102 new stopped location) for which the 360-degree threat detection sensor system 120 has an obstructed field-of-view. In accordance with some embodiments, the electronic computing device may display a map view (e.g., at the officer's personal radio communication device 105 or vehicular computing device 108) corresponding to the updated virtual boundary 412. The map view may further visually distinguish the areas (e.g., areas 420, 422, 424) that are obstructed by objects (identified as surrounding the vehicle 102 at the vehicle's new stopped location and for which the 360-degree threat detection sensor system 120 has an obstructed field-of-view), from other areas (e.g., areas 408 and 428) for which the 360-degree threat detection sensor has now gained and/or retained the unobstructed field-of-view.

Figure 5A:
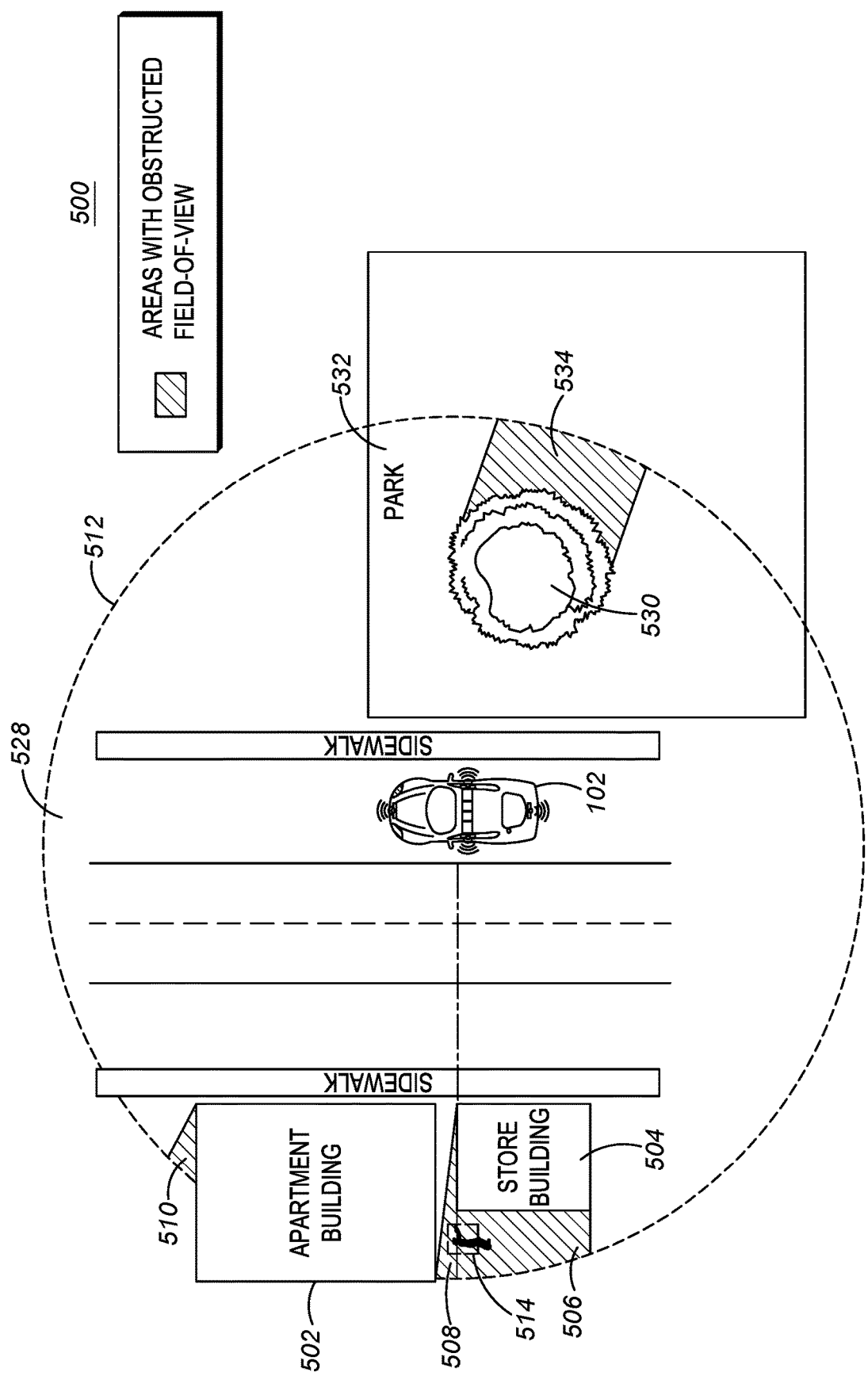
FIGS. 5A and 5B illustrate a second example scenario for enabling a 360-degree threat detection sensor system to monitor an area of interest surrounding a vehicle.
Figure 5B:
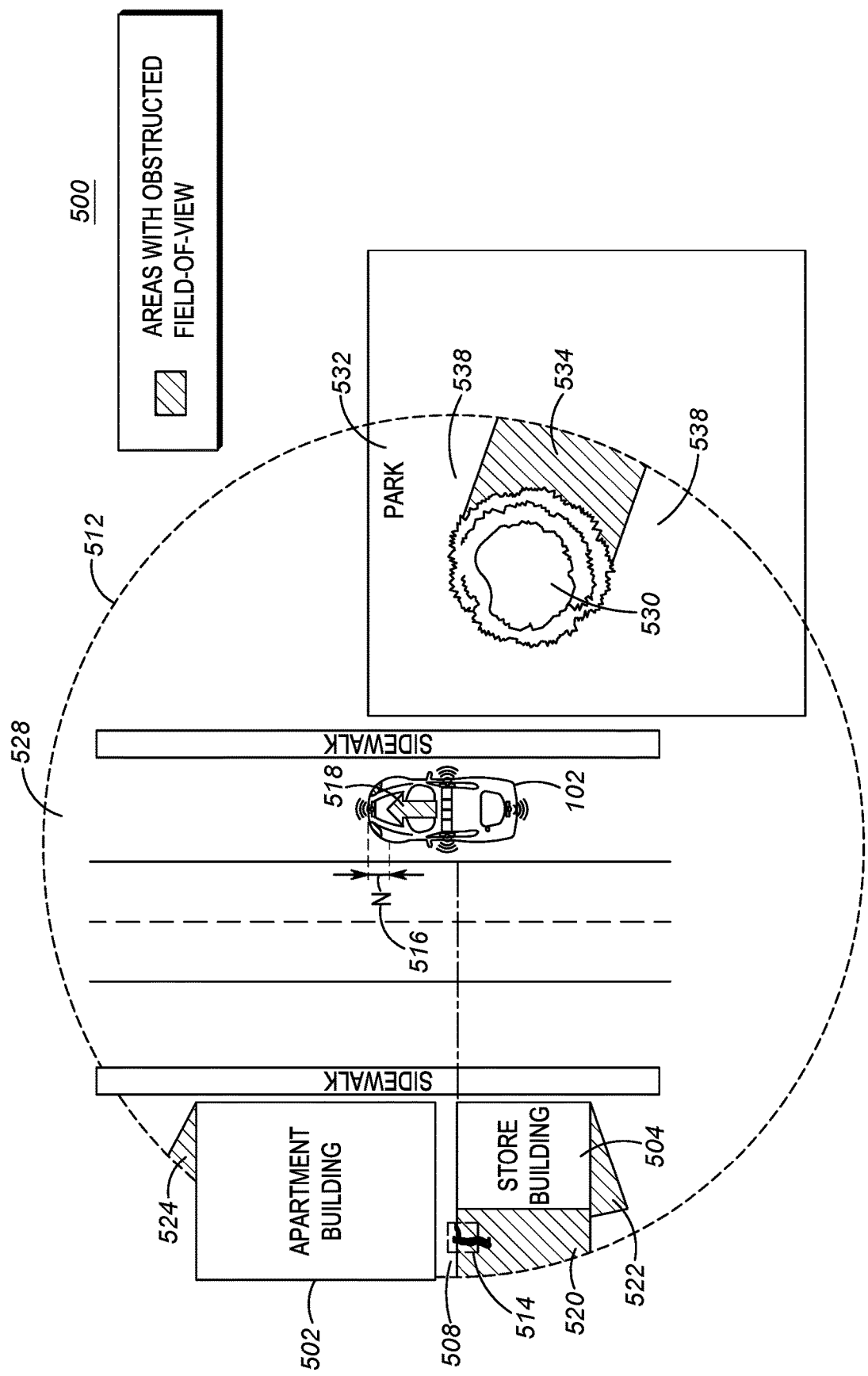

FIGS. 5A and 5B illustrate a second example scenario of enabling a 360-degree threat detection sensor system to monitor an area of interest surrounding a vehicle. In the second example scenario 500, a vehicle 102 is similarly shown as parked on the side of a street and further two physical structures (an apartment building 502 and a store building 504) are shown. In addition, in FIGS. 5A and 5B, physical features such as trees 530 located in a park 532 are shown. In this example scenario, the electronic computing device may begin the process 300 of enabling the 360-degree threat detection sensor system 120 to monitor an area of interest either in response to detecting that the vehicle 102 has been stopped at a particular location for a threshold duration of time or alternatively based on user input. As described above with reference to block 302, the electronic computing device determines the current stopped location of the vehicle 102 in response to a detected stopping of the vehicle 102 or alternatively in response to receiving user input.

The electronic computing device selects an area of interest surrounding the vehicle 102's current stopped location for which the 360-degree threat detection sensor system 120 is to be enabled for detecting threats approaching the vehicle 102. The area of interest is selected commensurate with block 304 shown in FIG. 3. As shown in FIG. 5A, the electronic computing device identifies four different areas 506, 508, 510, and 534 as being located within a virtual boundary 512 that is defined based on a detection range of the 360-degree threat detection sensor system 120. The area 506 is located behind the store building 504, the area 508 (e.g., alley) is located between the side walls of the two adjacent building structures i.e. of the apartment building 502 and the store building 504, the area 510 is located adjacent to the other side wall of the apartment building 502, and the area 534 represents the space in the park 532 behind the trees 530. In this example, the areas 506, 508, 510, and 534 correspond to areas for which the 360-degree threat detection sensor system 120 has an obstructed field-of-view. In accordance with some embodiments, the electronic computing device may display a map view (e.g., at the officer's personal radio communication device 105 or vehicular computing device 108) corresponding to the virtual boundary 512. The map view may further visually distinguish the areas (e.g., areas 506, 508, 510, 534) that are obstructed by objects (identified as surrounding the vehicle 102 at the vehicle's 102 current stopped location) and for which the 360-degree threat detection sensor system 120 has an obstructed field-of-view, from other areas (e.g., area 528) for which the 360-degree threat detection sensor system 120 has an unobstructed field-of-view.

As described above with reference to block 304 shown in FIG. 3, the electronic computing device may assign priority score to each of the areas 506, 508, 510, 534 based on one or more threat risk parameters. In the example scenario 500, the area 508 has an open space and further has an available path toward the vehicle 102, and therefore there is a high likelihood of threat (e.g., person 514) approaching toward the vehicle 102 from the area 508 in comparison to likelihood of threat approaching directly from areas 506, 510, and 534. For instance, there is a less likelihood of any threat directly approaching the vehicle 102 from the area 506 because the area is completed blocked by the physical structure corresponding to the store building 504 and therefore the 360-degree threat detection sensor system's 120 obstructed field-of-view of the area 506 may not affect the accuracy of threat detection process. Accordingly, based on the one or more threat risk parameters, the electronic computing device may select area 508 to be the area of interest for the purposes of enabling the 360-degree threat detection sensor system 120 to monitor the area 508. In the example scenario, the electronic computing device further determines, as described with reference to block 306 shown in FIG. 3, that the 360-degree threat detection sensor system 120 has an obstructed field-of-view of the area 508. This obstructed field-of view is due to the area 508 being blocked by the positioning of the 360-degree threat detection sensor system 120 at the vehicle's 102 current stopped location relative to the positions of the two identified adjacent building structures, i.e., apartment building 402 and store building 404. Accordingly, in this case, the electronic computing device is required to determine a new vehicle stop location for the vehicle 102 in order to enable the 360-degree threat detection sensor system 120 to have an unobstructed field-of-view of the area 508.

Now referring to FIG. 5B, the electronic computing device causes the vehicle 102 to move to a new vehicle stop location, where the new vehicle stop location is determined in accordance with block 308. In one embodiment, the electronic computing device computes the new vehicle stop location by computing the of distance 'N' 516 and further the direction 518 to be moved by the vehicle 102 in order for the 360-degree threat detection sensor system 120 that is physically coupled to the vehicle 102 to have an unobstructed field-of-view of the selected area 508. The location coordinate may be determined using the computed distance and direction. The location coordinate corresponding to the new vehicle stop location may then be used to generate a navigation route and/or further autonomously control the vehicle 102 to be moved to the new vehicle stop location.

When the vehicle 102 has moved the distance 516 in the determined direction 518 and further stopped at the new vehicle stop location in accordance with the instructions transmitted from the electronic computing device (see block 308, FIG. 3), the 360-degree threat detection sensor system 120 gains an unobstructed field-of-view of the area 508 of interest and is further able to capture 360-degree field-of-view of the entire travel path (including the previously obstructed area 508 of interest) that is located between the apartment building 502 and store building 504. Based on the captured field-of-view, the electronic computing device can detect any object (e.g., person 514) approaching the vehicle 102 from the area 508 and further determine whether the object can be classified as an approaching threat.

In some embodiments, the electronic computing device identifies and updates the virtual boundary 512 based on the vehicle's 102 new stopped location. The electronic computing device may further identify and display updated areas (e.g., areas 520, 522, 524, 534 shown in FIG. 5B surrounding the vehicle 102 at the vehicle's 102 new stopped location) for which the 360-degree threat detection has obstructed field-of-view. In accordance with some embodiments, the electronic computing device may display a map view (e.g., at the officer's personal radio communication device 105 or vehicular computing device 108) corresponding to the updated virtual boundary 512. The map view may further visually distinguish the areas (e.g., areas 520, 522, 524, 534) that are obstructed by objects (identified as surrounding the vehicle 102 at the vehicle's 102 new stopped location and for which the 360-degree threat detection sensor system 120 has an obstructed field-of-view), from other areas (e.g., areas 508, 528) for which the 360-degree threat detection sensor system 120 has now gained and/or retained the unobstructed field-of-view. As shown in FIG. 5B, the vehicle's 102 new stopped location also shifts the 360-degree threat detection sensor system's 120 field-of-view coverage to the space (i.e., new obstructed area 534) behind the tree. However, the vehicle's 102 new stopped location is not likely to affect the accuracy of the threat detection process because the 360-degree threat detection sensor system 120 has an unobstructed field-of-view of the open areas 538 around the trees 530 and therefore the 360-degree threat detection sensor system 120 will be able to still detect and classify any object approaching the vehicle 102 from the open areas 538 near the park 532.

Figure 6A:
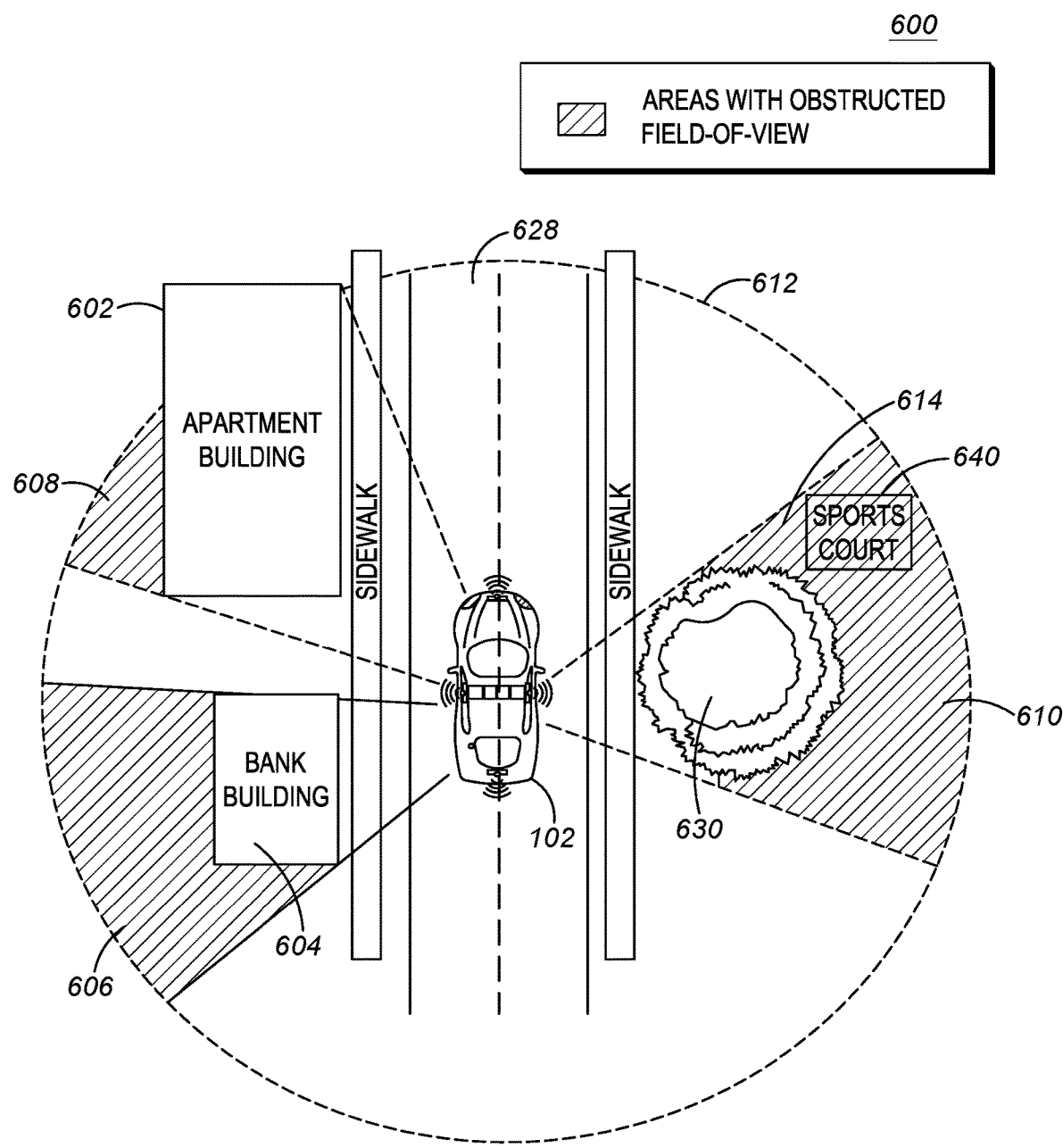
FIGS. 6A and 6B illustrate a third example scenario for enabling a 360-degree threat detection sensor system to monitor an area of interest surrounding a vehicle.
Figure 6B:
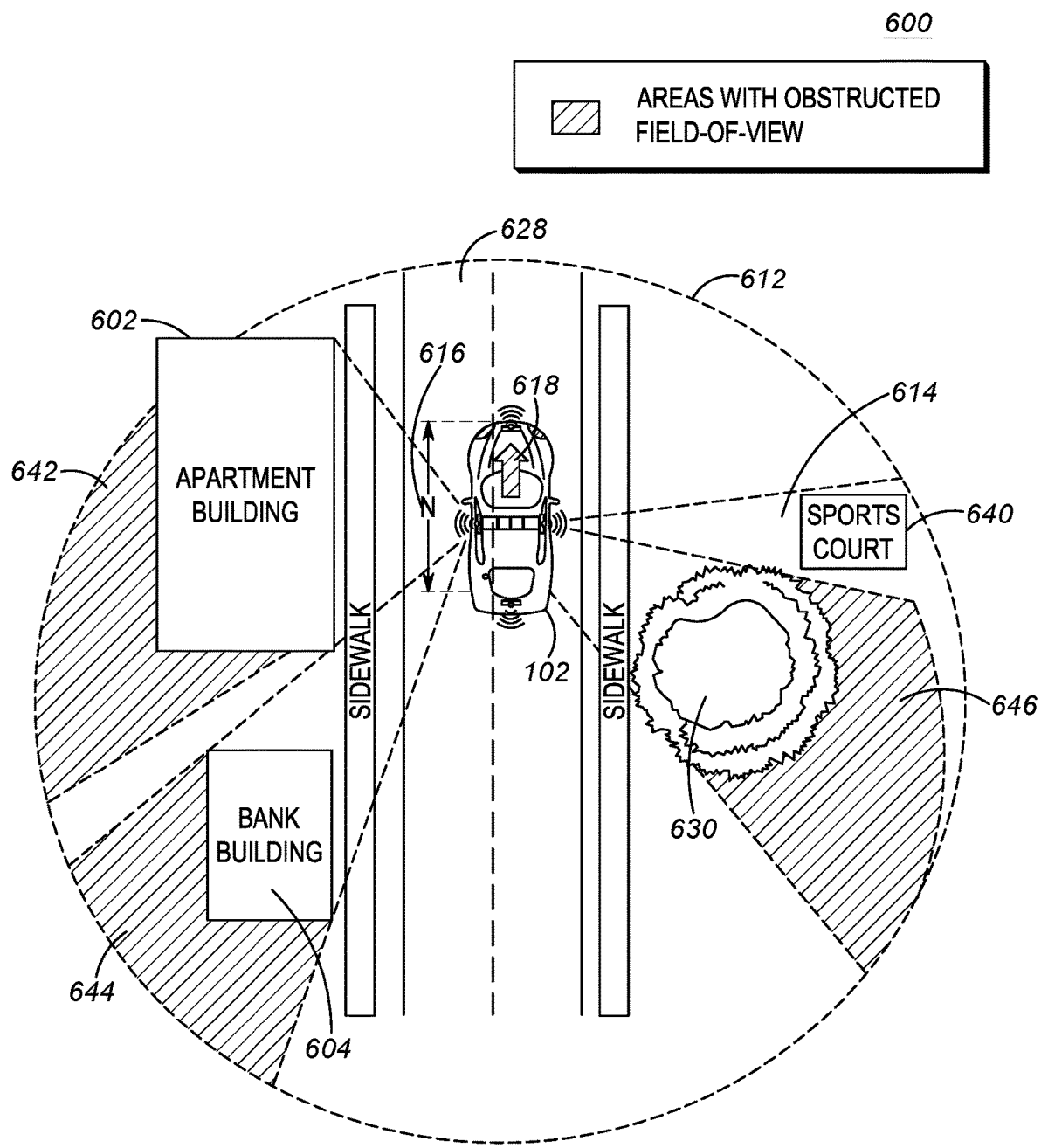

FIGS. 6A and 6B illustrate a third example scenario 600 of enabling a 360-degree threat detection sensor system to monitor an area of interest surrounding a vehicle. In the third example scenario 600, a vehicle 102 is similarly shown as parked on a street and further two physical features (an apartment building 602 and a bank building 604) are shown. In addition, in FIGS. 6A and 6B, physical features such as trees 630 and a sports court 640 located on the right side of the street is also shown. In this example scenario 600, the electronic computing device may begin the process 300 of enabling the 360-degree threat detection sensor system 120 to monitor an area of interest either in response to detecting that the vehicle 102 has been stopped at a particular location for a threshold duration of time or alternatively based on user input. As described above with reference to block 302, the electronic computing device determines the current stopped location of the vehicle 102 in response to a detected stopping of the vehicle 102 or alternatively in response to receiving user input.

The electronic computing device selects an area of interest surrounding the vehicle 102's current stopped location for which the 360-degree threat detection sensor system 120 is to be enabled for detecting threats approaching toward the vehicle 102. The area of interest is selected commensurate with block 304 shown in FIG. 3. As shown in FIG. 6A, the electronic computing device identifies three different areas 606, 608, and 610 as being located within a virtual boundary 612 that is defined based on a detection range of the 360-degree threat detection sensor system 120. The area 606 is located behind the bank building 604, the area 608 is located behind the apartment building 602, and the area 610 represent the space near the sports court 640 and the trees 630. In this example, the areas 606, 608, and 610 correspond to areas for which the 360-degree threat detection sensor system has an obstructed field-of-view. In accordance with some embodiments, the electronic computing device may display a map view (e.g., at the officer's personal radio communication device 105 or vehicular computing device 108) corresponding to the virtual boundary 612. The map view may further visually distinguish the areas (e.g., areas 606, 608, and 610) that are obstructed by objects (identified as surrounding the vehicle 102 at the vehicle's 102 current stopped location) and for which the 360-degree threat detection sensor system 120 has an obstructed field-of-view, from other areas (e.g., area 628) for which the 360-degree threat detection sensor has an unobstructed field-of-view.

As described above with reference to block 304 shown in FIG. 3, the electronic computing device may assign priority score to each of the areas 506, 508, 510 based on one or more threat risk parameters. Based on the priority score assigned to each of the areas 606, 608, and 610, or alternatively based on the information known to the officer 104, the officer 104 may interact with the map view and may further identify particular one of the areas as the area of interest for monitoring and detecting threats. In the example scenario shown in FIG. 6A, the officer may be concerned that the likelihood of threat originating from an open space 614 near the sports court 640 is very high. The officer 104 may further select the open space 614 as the area of interest. Accordingly, in response to the officer's selection of an area corresponding to the open space 614, the electronic computing device determines a new vehicle stop location for the vehicle 102 that would allow the 360-degree threat detection to have an unobstructed field-of-view of the open space area 614.

Now referring to FIG. 6B, the electronic computing device causes the vehicle 102 to move to a new vehicle stop location, where the new vehicle stop location is determined in accordance with block 308. In one embodiment, the electronic computing device determines the new vehicle stop location by computing the distance 'N' 616 and further the direction 618 to be moved by the vehicle 102 in order for the 360-degree threat detection sensor system 120 that is physically coupled to the vehicle 102 to have an unobstructed field-of-view of the area 614. The location coordinate may then be determined using the computed distance and direction. The location coordinate corresponding to the new vehicle stop location may then be used to generate a navigation route and/or further autonomously control the vehicle 102 to be moved to the new vehicle stop location.

As shown in FIG. 6B, when the vehicle 102 has moved the distance 616 in the determined direction 618 and further stopped at the new vehicle stop location in accordance with the instructions transmitted from the electronic computing device (see block 310, FIG. 3), the 360-degree threat detection sensor system 120 gains an unobstructed field-of-view of the area 614 of interest and is further able to capture 360-degree field-of-view of the open space corresponding to the area 614 near the sports court 640. Based on the captured field-of-view, the electronic computing device can detect any object approaching toward the vehicle 102 from the open space and further determine whether the object can be classified as an approaching threat.

In some embodiments, the electronic computing device may identify and update the virtual boundary 612 based on the vehicle's 102 new stopped location. The electronic computing device may further identify and display areas (e.g., areas 642, 644, 646 shown in FIG. 6B surrounding the vehicle 102 at the vehicle's 102 new stopped location) for which the 360-degree threat detection has an obstructed field-of-view. In accordance with some embodiments, the electronic computing device may display a map view (e.g., at the officer's personal radio communication device 105 or vehicular computing device 108) corresponding to the updated virtual boundary 612. The map view may further visually distinguish the areas (e.g., areas 642, 644, 646) that are obstructed by objects (identified as surrounding the vehicle 102 at the vehicle's 102 new stopped location and for which the 360-degree threat detection sensor system 120 has an obstructed field-of-view), from other areas (e.g., areas 614, 628) for which the 360-degree threat detection sensor has now gained and/or retained the unobstructed field-of-view.

Figure 7A:
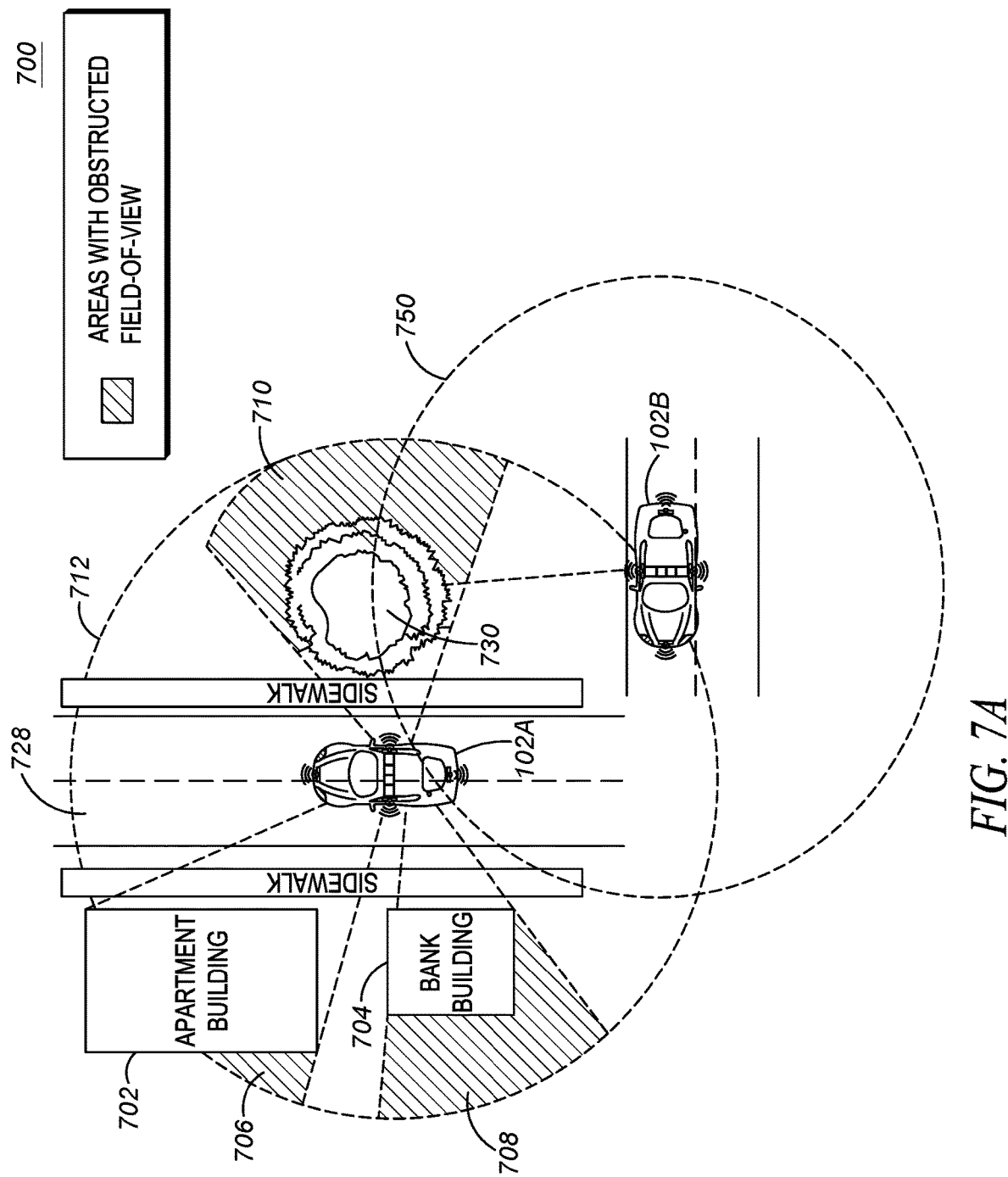
FIGS. 7A and 7B illustrate a fourth example scenario for enabling a 360-degree threat detection sensor system to monitor an area of interest surrounding a vehicle.
Figure 7B:
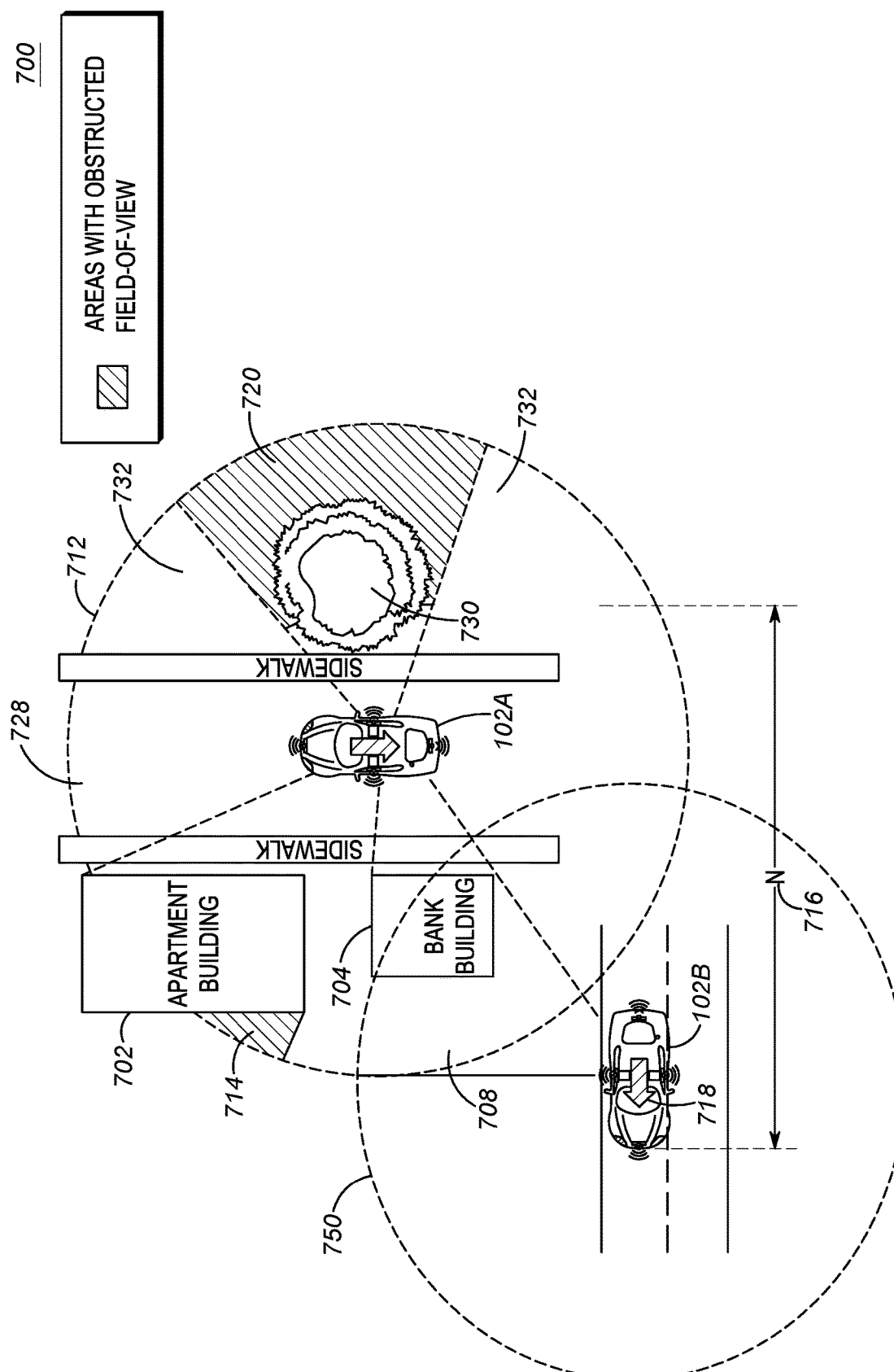

FIGS. 7A and 7B illustrate a fourth example scenario of enabling a 360-degree threat detection sensor system to monitor an area of interest surrounding the vehicle. In the fourth example scenario 700, a vehicle 102A is shown as parked on the side of a street and further two physical structures (an apartment building 702 and a bank building 704) are shown. Also, physical features such as trees 730 located on the right side of the street are shown. In addition, in the example scenario 700, a second vehicle 102B is shown as being parked on another street that intersects with the street in which the vehicle 102A is parked. In this example scenario, the electronic computing device may begin the process 300 of enabling the 360-degree threat detection sensor system to monitor an area of interest either in response to detecting that the vehicle 102A has been stopped at a particular location for a threshold duration of time or alternatively based on user input. As described above with reference to block 302, the electronic computing device determines the current stopped location of the vehicle 102A in response to a detected stopping of the vehicle 102A or alternatively in response to receiving user input.

The electronic computing device selects an area of interest surrounding the vehicle 102A's current stopped location for which the 360-degree threat detection sensor system 120 is to be enabled for detecting threats approaching the vehicle 102A. The area of interest is selected commensurate with block 304 shown in FIG. 3. As shown in FIG. 7A, the electronic computing device identifies three different areas 706, 708, and 710 as being located within a virtual boundary 712 that is defined based on a detection range of the 360-degree threat detection sensor system 120. The area 706 is located behind the apartment building 702, the area 708 is located behind the bank building 704, and the area 710 represent the space behind the trees 730. In this example, the areas 706, 708, 710 correspond to areas for which the 360-degree threat detection sensor system 120 has an obstructed field-of-view. In accordance with some embodiments, the electronic computing device may display a map view (e.g., at the officer's personal radio communication device 105 or vehicular computing device 108) corresponding to the virtual boundary 712. The map view may further visually distinguish the areas (e.g., areas 706, 708, 710) that are obstructed by objects (identified as surrounding the vehicle 102 at the vehicle's current stopped location and for which the 360-degree threat detection sensor system 120 has an obstructed field-of-view), from other areas (e.g., area 728) for which the 360-degree threat detection sensor system 120 has an unobstructed field-of-view.

As described above with reference to block 304 shown in FIG. 3, the electronic computing device may assign priority score to each of the areas 706, 708, 710 based on one or more threat risk parameters. In this example, based on the one or more threat risk parameters and/or based on user input, the electronic computing device selects area 708 to be the area of interest for the purposes of enabling the 360-degree threat detection sensor system to monitor an area 708. In the example scenario, the electronic computing device further determines, as described with reference to block 306 shown in FIG. 3, that the 360-degree threat detection sensor system 120 has an obstructed field-of-view of the area 708. This obstructed field-of view is due to the area 708 being blocked by the positioning of the 360-degree threat detection sensor system 120 at the vehicle's 102A current stopped location relative to the position of the bank building 704.

In accordance with some embodiments, the electronic computing device determines whether a second 360-degree threat detection sensor system that is physically coupled to another vehicle 102B is available for monitoring the selected area 708. The decision to select a second 360-degree threat detection sensor may be triggered based on a determined status and/or context of the vehicles 102A, 102B and/or its occupants (e.g., the vehicle 102 is actively monitoring another area of interest with higher priority score, the occupant of the vehicle 102 has been requested to move to another location to respond to another incident etc.) or alternatively in response to a request (e.g., received from dispatch console 158) to maximize the number of areas of interest to be monitored (i.e., to expand the 360-degree field-of-view coverage at a particular incident location) by relatively positioning more than one vehicle 102 relative to the areas of interest.

In accordance with some embodiments, the availability of another 360-degree threat detection sensor system can be determined based one or more parameters selected from the group consisting of: (i) current location of a vehicle 102B equipped with 360-degree threat detection sensor system, for example, to determine whether the vehicle 102B can reach the location near the area of interest within a threshold period of time, (ii) status and/or context of the vehicle 102B and/or its occupants, for example, to determine whether the 360-degree threat detection sensor system is actively monitoring another area of interest, or whether the officer associated with the vehicle 102B is currently responding to an active incident, (iii) operating features of the vehicle 102B, for example, to determine whether the vehicle 102B is capable of being driven to a new vehicle stop location to allow the vehicle's 102B 360-degree threat detection sensor system to be enabled for monitoring the area of interest. Other parameters such as fuel level of the vehicle 102B, vehicle owner's subscription to monitor area of interest, vehicle's self-driving capability etc., can also be used to determine the availability. In some embodiments, the vehicular computing devices associated with the respective vehicles 102A, 102B exchange field-of-view coverage information associated with the respectively coupled 360-degree threat detection sensor systems as well as the respective vehicle's status and context information to determine if one or more of the vehicles 102A, 102B need to be positioned and/or moved relative to the areas of interest to improve the field-of-view coverage corresponding to the areas of interest.

In the example scenario shown in FIG. 7A, the electronic computing device determines that a second 360-degree threat detection sensor system associated with the second vehicle 102B is available for monitoring the area of interest. The electronic computing device further determines whether the second 360-degree threat detection sensor system associated with the vehicle 102B has an unobstructed field-of-view of the selected area 708 of interest based on the vehicle's 102B current stopped location. For example, the electronic computing device determines that the area 708 of interest is outside of a virtual boundary 750 that is defined based on a detection range of the 360-degree threat detection sensor system associated with the vehicle 102B. Accordingly, the electronic computing device determines a new vehicle stop location for the second vehicle 102B that would allow the second 360-degree threat detection associated with the second vehicle 102B to have an unobstructed field-of-view of the area 408.

Now referring to FIG. 7B, the electronic computing device causes the vehicle 102B to move to a new vehicle stop location, where the new vehicle stop location is determined in accordance with block 308. In one embodiment, the electronic computing device determines the new vehicle stop location by computing the distance 'N' 716 and further the direction 718 to be moved by the vehicle 102B in order for the second 360-degree threat detection sensor system 120 that is physically coupled to the vehicle 102B to have an unobstructed field-of-view of the selected area 708. The location coordinate may then be determined using the computed distance and direction. The location coordinate corresponding to the new vehicle stop location may then be used to generate a navigation route and/or further autonomously control the vehicle 102B to be moved to the new vehicle stop location. The location coordinate corresponding to the new vehicle stop location may then be used to generate navigation route and further autonomously control the second vehicle 102B to be moved to the new vehicle stop location.

Now referring to FIG. 7B, when the vehicle 102B has moved and stopped at the new vehicle stop location in accordance with the instructions transmitted from the electronic computing device (see block 308, FIG. 3) or from vehicular computing device of the first vehicle 102A to a vehicular computing device of the second vehicle 102B, the second 360-degree threat detection sensor system 120 associated with the vehicle 102B gains an unobstructed field-of-view of the area of interest 708 and is further able to capture 360-degree field-of-view of the area of interest 708 that is located behind the bank building 704. Based on the captured field-of-view, the electronic computing device can detect the presence of an object in the area of interest 708 and further determine whether the object can be classified as a threat. In accordance with some embodiments, more than one vehicle can be caused to be re-positioned relative to the areas of interest to maximize the field-of-view coverage corresponding to the areas of interest. For example, as shown in FIG. 7B, the electronic computing device causes the vehicle 102A to also be moved and stopped at another vehicle stop location to expand the field-of-view coverage near the open space 732 around trees 730. In some embodiments, the electronic computing device may identify and update the virtual boundaries 712, 750 associated with the respective vehicles 102A and 102B based on the new stopped locations of the respective vehicles 102A and 102B. The electronic computing device may identify and display areas (e.g., areas 714, 720 shown in FIG. 7B surrounding the vehicle 102A at the vehicle's 102A new stopped location) for which the respectively associated 360-degree threat detection sensor systems have obstructed field-of-view. In accordance with some embodiments, the electronic computing device may display a map view (e.g., at the officer's personal radio communication device 105 or vehicular computing device 108) corresponding to the updated virtual boundaries 712, 750. The map view may further visually distinguish the areas (e.g., areas 714, 720) that are obstructed by objects (identified as surrounding the vehicle 102A at the vehicle's 102A new stopped location and for which the 360-degree threat detection sensor systems associated with the both the vehicles 102A, 102B have an obstructed field-of-view), from other areas (e.g., areas 708, 728, 732) for which one or more of the respectively associated 360-degree threat detection sensor systems have now gained and/or retained the unobstructed field-of-view.

In accordance with embodiments described herein, systems, devices, and methods disclosed herein can be advantageously employed to cause the vehicle to stop at an optimal location to enable 360-degree threat detection sensor systems to gain unobstructed field-of-view of areas of interest which are obstructed by objects surrounding the vehicle. Similarly, the embodiments described herein enable vehicles to collaborate with each other to maximize the field-of-view coverage for an incident location. Such maximization of field-of-view coverage and gaining unobstructed field-of-view of an area of interest improves the accuracy of threat detection process, thereby reducing the threat risk to vehicle occupants such as officers positioned in the areas surrounding the vehicle.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for enabling a 360-degree threat detection sensor system to monitor an area of interest surrounding a vehicle, the method comprising:
   determining, at an electronic computing device, a first vehicle stop location corresponding to a current stopped location of a vehicle or a predetermined vehicle stop location;
   selecting, at the electronic computing device, an area of interest surrounding the first vehicle stop location to be monitored by a 360-degree threat detection sensor system that is physically coupled to the vehicle;
   determining, at the electronic computing device, whether the 360-degree threat detection sensor system has an obstructed field-of-view of the selected area of interest when the vehicle is stopped at the first vehicle stop location;
   responsive to determining that the 360-degree threat detection sensor system has an obstructed field-of-view of the area of interest, determining, at the electronic computing device, at the first vehicle stop location, a second vehicle stop location at which the 360-degree threat detection sensor system has an unobstructed field-of-view of the area of interest where the vehicle is to be stopped at the second vehicle stop location; and
   responsive to determining that the 360-degree threat detection sensor system has an unobstructed field-of-view of the area of interest at the second vehicle stop location, transmitting, at the electronic computing device, an instruction to a target electronic device to cause one of (i) an electronic indication identifying the second vehicle stop location to be provided to a registered occupant of the vehicle, and (ii) the vehicle to be autonomously stopped at the second vehicle stop location.

2. The method of claim 1, wherein determining the second vehicle stop location comprises:
   identifying, at the electronic computing device, based on data received from the 360-degree threat detection sensor system and pre-generated map data stored in the electronic computing device identifying objects known to be present in a geographical area relative to the first vehicle stop location, one or more physical features surrounding the first vehicle stop location that cause the 360-degree threat detection sensor system to have the obstructed field-of-view of the selected area of interest when the vehicle is stopped at the first vehicle stop location;
   determining, at the electronic computing device, a position of each of the one or more physical features;
   determining, at the electronic computing device, a position of the 360-degree threat detection sensor system when the vehicle is stopped at the first vehicle stop location; and
   determining, at the electronic computing device, the second vehicle stop location based on (i) the position of each of the one or more physical features and (ii) the position of the 360-degree threat detection sensor system.

3. The method of claim 1, wherein determining the second vehicle stop location comprises:
   identifying, at the electronic computing device, based on data received from the 360-degree threat detection sensor system and pre-generated map data stored in the electronic computing device for identifying objects known to be present in a geographical area relative to the first vehicle stop location, a first physical feature and a second physical feature surrounding the first vehicle stop location that cause the 360-degree threat detection sensor system to have the obstructed field-of-view of the selected area of interest when the vehicle is stopped at the first vehicle stop location;
   generating, at the electronic computing device, a coordinate system that maps respective positions of the first physical feature and second physical feature relative to a current position of the 360-degree threat detection sensor system; and
   determining the second vehicle stop location by computing a distance and direction to be moved by the vehicle to place the 360-degree threat detection sensor system at a new position at which the 360-degree threat detection sensor system has an unobstructed field-of-view of the selected area of interest.

4. The method of claim 3, wherein the distance is computed using a mathematical function $N=y1+(y2-y1)/2$, wherein 'N' represents a unit of the distance to be moved by the vehicle, 'y1' represents an ordinate value corresponding to the position of the first physical feature when the current position of the 360-degree threat detection sensor system is plotted at the origin of the coordinate system, and 'y2' represents an ordinate value corresponding to the position of the second physical feature when the current position of the 360-degree threat detection sensor system is plotted at the origin of the coordinate system.

5. The method of claim 1, further comprising:
receiving a user input identifying one of a plurality of areas surrounding the vehicle when the vehicle is stopped at the first vehicle stop location,
wherein selecting the area of interest comprises selecting the identified one of the plurality of areas.

6. The method of claim 1, further comprising:
identifying, at the electronic computing device, a plurality of areas surrounding the vehicle when the vehicle is stopped at the first vehicle stop location; and
assigning, at the electronic computing device, a priority score to each of the plurality of areas based on one or more threat risk parameters associated with the respective areas,
wherein selecting the area of interest comprises selecting one of the plurality of areas that has an assigned priority score that is higher than assigned priority scores of the other of the plurality of areas.

7. The method of claim 1, further comprising:
selecting, at the electronic computing device, a second area of interest to be monitored by the 360-degree threat detection sensor system;
determining, at the electronic computing device, that the 360-degree threat detection sensor system has an unobstructed field-of-view of the second area of interest when the vehicle is stopped at the first vehicle stop location based on data received from the 360-degree threat detection sensor system;
determining, at the electronic computing device, that the 360-degree threat detection sensor system has an obstructed field-of-view of the second area of interest when the vehicle is to be stopped at the second vehicle stop location based on pre-generated map data stored in the electronic computing device identifying objects known to be present in a geographical area relative to the second vehicle stop location and the second area of interest; and
transmitting, at the electronic computing device, an instruction to cause the vehicle to autonomously move between the first and second vehicle stop locations and further stop at the first and second vehicle stop locations at periodic intervals to enable the 360-degree threat detection sensor system to have (i) an unobstructed field-of-view of the area of interest when the vehicle stops at the second vehicle stop location and (ii) an unobstructed field-of-view of the second area of interest when the vehicle stops at the first vehicle stop location.

8. The method of claim 1, further comprising:
selecting, at the electronic computing device, a second area of interest to be monitored by the 360-degree threat detection sensor system;
determining, at the electronic computing device, that the 360-degree threat detection sensor system has an obstructed field-of-view of the second area of interest when the vehicle is stopped at one or more of the first vehicle stop location and the second vehicle stop location;
determining, at the electronic computing device, that a second 360-degree threat detection sensor system physically coupled to a second vehicle is available for monitoring the second area of interest; and
transmitting, at the electronic computing device, an instruction to a target electronic device associated with the second vehicle to request the second 360-degree threat detection sensor system to monitor the second area of interest.

9. The method of claim 1, further comprising:
detecting, at the electronic computing device, that the vehicle has stopped at the first vehicle stop location;
defining, at the electronic computing device, a virtual boundary surrounding the first vehicle stop location based on a detection range of the 360-degree threat detection sensor system;
detecting, at the electronic computing device, one or more physical features within the virtual boundary surrounding the first vehicle stop location;
identifying, at the electronic computing device, one or more areas within the virtual boundary that are obstructed by the one or more physical features; and
determining, at the electronic computing device, that the 360-degree threat detection sensor system has an obstructed field-of-view of the selected area of interest when the selected area of interest overlaps with the one or more of the identified areas within the virtual boundary.

10. The method of claim 9, further comprising:
displaying, at the electronic computing device, a map view corresponding to the virtual boundary, the map view visually distinguishing the one or more identified areas from other areas within the virtual boundary surrounding the first vehicle stop location.

11. The method of claim 1, wherein the 360-degree threat detection sensor system comprises a 360-degree vehicular light imaging or radio wave distancing system.

12. An electronic processing system for enabling a 360-degree threat detection sensor system to monitor an area of interest surrounding a vehicle, the system comprising:
a memory;
a transceiver;
a 360-degree threat detection sensor system physically coupled to a vehicle; and
one or more electronic processors communicatively coupled to the memory, the transceiver, and the 360-degree threat detection sensor system, the one or more electronic processors configured to:
determine a first vehicle stop location corresponding to a current stopped location of a vehicle or a predetermined vehicle stop location;
select an area of interest surrounding the first vehicle stop location to be monitored by a 360-degree threat detection sensor system that is physically coupled to the vehicle;
determine whether the 360-degree threat detection sensor system has an obstructed field-of-view of the selected area of interest when the vehicle is stopped at the first vehicle stop location;
responsive to determining that the 360-degree threat detection sensor system has an obstructed field-of-view of the area of interest, determine, at the first vehicle stop location, one or more second vehicle stop locations at which the 360-degree threat detection sensor system has an unobstructed field-of-view of the area of interest where the vehicle is to be stopped at the second vehicle stop locations; and
responsive to determining that the 360-degree threat detection sensor system has an unobstructed fieldof-view of the area of interest at the second vehicle stop location, transmit, via the transceiver, an instruction to a target electronic device to cause one of (i) an electronic indication identifying one or more of the second vehicle stop locations to be provided to a registered occupant of the vehicle, and (ii) the vehicle to be autonomously stopped at one of the second vehicle stop locations.

13. The electronic processing system of claim 12, wherein the one or more electronic processors is configured to:
identify, based on data received from the 360-degree threat detection sensor system and pre-generated map data stored in the electronic computing device identifying objects known to be present in a geographical area relative to the first vehicle stop location, one or more physical features surrounding the first vehicle stop location that cause the 360-degree threat detection sensor system to have the obstructed field-of-view of the selected area of interest when the vehicle is stopped at the first vehicle stop location;
determine a position of each of the one or more physical features;
determine a position of the 360-degree threat detection sensor system when the vehicle is stopped at the first vehicle stop location; and
determine the second vehicle stop location by computing a distance and direction to be moved by the vehicle based on (i) the position of each of the one or more physical features and (ii) the position of the 360-degree threat detection sensor system.

14. The electronic processing system of claim 12, wherein the one or more electronic processors is configured to:
identify a plurality of areas surrounding the vehicle when the vehicle is stopped at the first vehicle stop location; and
assign a priority score to each of the plurality of areas based on one or more threat risk parameters associated with the respective areas, wherein the selected area of interest corresponds to one of the plurality of areas that has an assigned priority score that is higher than assigned priority scores of the other of the plurality of areas.

15. The electronic processing system of claim 12, wherein the one or more electronic processors is configured to:
select a second area of interest to be monitored by the 360-degree threat detection sensor system;
determine that the 360-degree threat detection sensor system has an unobstructed field-of-view of the second area of interest when the vehicle is stopped at the first vehicle stop location based on data received from the 360-degree threat detection sensor system;
determine that the 360-degree threat detection sensor system has an obstructed field-of-view of the second area of interest when the vehicle is to be stopped at the second vehicle stop location based on pre-generated map data stored in the electronic computing device identifying objects known to be present in a geographical area relative to the second vehicle stop location and the second area of interest; and
transmit, via the transceiver, an instruction to cause one or more of the vehicle to autonomously move between the first and second vehicle stop locations and further stop at the first and second vehicle locations at periodic intervals to enable the 360-degree threat detection sensor system to have (i) an unobstructed field-of-view of the area of interest when the vehicle stops at the second vehicle stop location and (ii) an unobstructed field-of-view of the second area of interest when the vehicle stops at the first vehicle stop location.

16. The electronic processing system of claim 12, wherein the one or more electronic processors is configured to:
select a second area of interest to be monitored by the 360-degree threat detection sensor system;
determine that the 360-degree threat detection sensor system has an obstructed field-of-view of the second area of interest when the vehicle is stopped at one or more of the first vehicle stop location and the second vehicle stop location;
determine that a second 360-degree threat detection sensor system physically coupled to a second vehicle is available for monitoring the second area of interest; and
transmit an instruction to a target electronic device associated with the second vehicle to request the 360-degree threat detection sensor system to monitor the second area of interest.

17. The electronic processing system of claim 12, wherein the 360-degree threat detection sensor system comprises a 360-degree vehicular light imaging or radio wave distancing system.

* * * * *